US012749983B2

(12) United States Patent
Shen et al.

(10) Patent No.: US 12,749,983 B2
(45) Date of Patent: Sep. 29, 2026

(54) CONTROLLER AND CONTROL METHOD FOR AN ASYMMETRIC HALF-BRIDGE POWER SUPPLY

(71) Applicant: Ark HDPS Semiconductor Pte. LIMITED, Singapore (SG)

(72) Inventors: Yi-Lun Shen, Taipei City (TW); Yu-Yun Huang, Taipei City (TW)

(73) Assignee: Ark HDPS Semiconductor Pte. LIMITED., Singapore (SG)

( * ) Notice: Subject to any disclaimer, the term of this patent is extended or adjusted under 35 U.S.C. 154(b) by 158 days.

(21) Appl. No.: 18/792,592

(22) Filed: Aug. 2, 2024

(65) Prior Publication Data

US 2025/0047207 A1 Feb. 6, 2025

(30) Foreign Application Priority Data

Aug. 2, 2023 (CN) ......................... 202310961428.1

(51) Int. Cl.
*H02M 3/335* (2006.01)
*H02M 1/00* (2007.01)
*H02M 3/00* (2006.01)

(52) U.S. Cl.
CPC ..... *H02M 3/33571* (2021.05); *H02M 1/0058* (2021.05); *H02M 3/01* (2021.05); *H02M 3/33592* (2013.01)

(58) Field of Classification Search
CPC .. H02M 1/0058; H02M 3/01; H02M 3/33571; H02M 3/33592
See application file for complete search history.

(56) References Cited

U.S. PATENT DOCUMENTS

| | | | | |
|---|---|---|---|---|
| 9,431,931 | B2 | 8/2016 | Zhou | |
| 10,122,286 | B2 | 11/2018 | Stuler | |
| 10,340,914 | B1 | 7/2019 | Wu | |
| 10,374,516 | B2 | 8/2019 | Moon | |
| 12,047,005 | B2 | 7/2024 | Chou | |
| 2019/0036442 | A1* | 1/2019 | Oh | H02M 3/33592 |
| 2023/0275516 | A1* | 8/2023 | Oh | H02M 1/0058 363/21.04 |

FOREIGN PATENT DOCUMENTS

| | | |
|---|---|---|
| TW | 202002483 | 1/2020 |
| TW | 202322539 | 6/2023 |
| WO | 2023/011777 | 2/2023 |

* cited by examiner

*Primary Examiner* — Jue Zhang
(74) *Attorney, Agent, or Firm* — Winston Hsu

(57) ABSTRACT

A controller and a control method for an asymmetric half-bridge power supply are disclosed. The asymmetric half-bridge power supply includes a first arm switch and a second arm switch forming a half-bridge, and a resonant circuit connected to the half-bridge. The method includes providing a duration parameter reflecting a second turn-on time of the second arm switch in a earlier switching cycle; providing a control signal to turn on the first arm switch for a first turn-on time in a later switching cycle; detecting whether the first arm switch has performed ZVS in response to a signal edge of the control signal to adjust the duration parameter accordingly; determining the second turn-on time of the second arm switch in the later switching cycle based on the duration parameter; and turning on the second arm switch for the second turn-on time after the first turn-on time in the later switching cycle.

16 Claims, 12 Drawing Sheets

CONTROLLER AND CONTROL METHOD FOR AN ASYMMETRIC HALF-BRIDGE POWER SUPPLY

BACKGROUND OF THE INVENTION

1. Field of the Invention

The disclosure is related to an electronic technique, and more particularly, a controller and control method for an asymmetric half-bridge power supply.

2. Description of the Prior Art

A power supply can be used to convert the input voltage into one or more output voltages, which serve as the input voltage for electronic products. With the widespread use of portable electronic products, power supplies are also required to operate with high power, high efficiency, and small size.

A type of power supply, the asymmetric half-bridge (AHB) power supply, with a transformer has a simple structure and can provide power greater than 100 W. This power supply has high-side and low-side switches configured in a half-bridge structure on the primary side of the transformer, and different pulse width modulation (PWM) signals can be provided for the high-side switch and the low-side switch, hence it is called asymmetric. The transformer in the AHB power supply is also connected to an oscillating capacitor on the primary side to form a resonance circuit.

When the load powered by the AHB power supply is heavy, the high-side switch and the low-side switch are roughly complementary in one switching cycle. The resonance circuit can undergo charging and discharging and resonate, which can make the high-side and low-side switches perform zero voltage switching (ZVS) with low switching loss, and has superior conversion efficiency.

When the load supplied by the AHB power supply is medium or light, one way to reduce switch loss is to increase the switching cycle, that is, to reduce the switch frequency. However, when the switching cycle of the AHB power supply increases, maintaining ZVS for the high-side and low-side switches becomes a technical challenge.

Patent publication number CN111010036A teaches when the load is light, in a switching cycle of discontinuous conduction mode (DCM), the low-side switch of the AHB power supply is turned on (i.e., in a conductive state for a period of time) only once, and the high-side switch is turned on twice (i.e., once after the low-side switch is turned on, and another time before the low-side switch is turned on in the next switching cycle).

Patent publication number CN104779806A teaches in one switching cycle, the low-side switch of the AHB power supply is turned on only once, and the high-side switch is also turned on only once. When the load is heavy, the high-side switch is turned on roughly immediately after the low-side switch is turned off, and the high-side and low-side switches are roughly complementary. When the load is light, the switching cycle becomes longer, that is, after the low-side switch is turned off, the high-side switch does not turn on immediately, but waits until this switching cycle is about to end. In other words, the high-side switch is turned on roughly before the start of the next switching cycle.

SUMMARY OF THE INVENTION

An embodiment provides a control method for an asymmetric half-bridge power supply, the asymmetric half-bridge power supply comprising a first arm switch and a second arm switch forming a half-bridge, the asymmetric half-bridge power supply further comprising a resonant circuit coupled to the half-bridge, the resonant circuit comprising a transformer and an oscillating capacitor. The control method comprises providing a duration parameter reflecting a second turn-on time of the second arm switch in an earlier switching cycle; providing a control signal to turn on the first arm switch for a first turn-on time; triggered by a signal edge of the control signal, detecting whether the first arm switch has performed ZVS (zero voltage switching) and adjusting the duration parameter accordingly; determining a second turn-on time based on the adjusted duration parameter; and after the first turn-on time has elapsed, turning on the second arm switch according to the determined second turn-on time in a later switching cycle.

Another embodiment provides a controller for an asymmetric half-bridge power supply, the asymmetric half-bridge power supply comprising a first arm switch and a second arm switch forming a half-bridge for controlling a resonant circuit, the resonant circuit comprising a transformer and an oscillating capacitor, the controller being used to control the first arm switch and the second arm switch. The controller comprises a first arm controller configured to provide a first control signal to turn on the first arm switch for a first turn-on time; and a second arm controller configured to provide a second control signal to turn on the second arm switch for a second turn-on time. The second arm controller comprises a ZVS (zero voltage switching) detection circuit configured to provide a duration parameter reflecting the second turn-on time of the second arm switch in a earlier switching cycle, detect whether the first arm switch has performed ZVS in response to a signal edge of the first control signal, and adjust the duration parameter accordingly; and a turn-on time controller configured to determine the second turn-on time within a later switching cycle according to the adjusted duration parameter.

These and other objectives of the present invention will no doubt become obvious to those of ordinary skill in the art after reading the following detailed description of the preferred embodiment that is illustrated in the various figures and drawings.

DETAILED DESCRIPTION

In the text, there are some identical symbols, which represent components with the same or similar structure, function, and operation principle. Those with general knowledge in the field can infer their relevance based on the teachings of this text. For conciseness, components with the same symbols will not be reintroduced.

In an AHB (asymmetrical half-bridge) power supply provided by an embodiment, a controller on a primary side can control a lower arm switch (i.e., first arm switch) and an upper arm switch (i.e., second arm switch) forming a half-bridge, and provide controls of a burst mode. In the burst mode, the controller can generate at least one switching cycle or a series of consecutive switching cycles. In each switching cycle, both the upper arm switch and the lower arm switch can only be turned on once, and after these switching cycles, before the start of other switching cycles, the controller can keep both the upper arm switch and the lower arm switch turned off for a neglect time. In each switching cycle of the burst mode, the controller can detect whether the lower arm switch has performed ZVS (zero voltage switching), to adjust an upper arm turn-on time (i.e., second turn-on time) of the upper arm switch, so that the lower arm switch can perform ZVS at the start of the next switching cycle. The goal is to operate the AHB power supply approximately in a critical mode (CRM). Each switching cycle can be regarded as a first switching cycle, and the next switching cycle after each switching cycle can be regarded as a second switching cycle.

Generally, a power supply can have three operating modes: continuous conduction mode (CCM), critical conduction mode (CRM), and discontinuous conduction mode (DCM). In a power supply, an inductive component serving for energy storage and conversion can be an inductor or a transformer. At the end of a switching cycle, the CCM can refer to a situation where a magnetizing current in an inductive component does not return to 0, and the next switching cycle begins. In contrast, the DCM refers to a situation where the magnetizing current approximately maintains at 0 for a period of time before the next switching cycle begins. CRM can be seen as a special case between CCM and DCM, where the next switching cycle can begin shortly after the magnetizing current equals 0.

Figure 1:
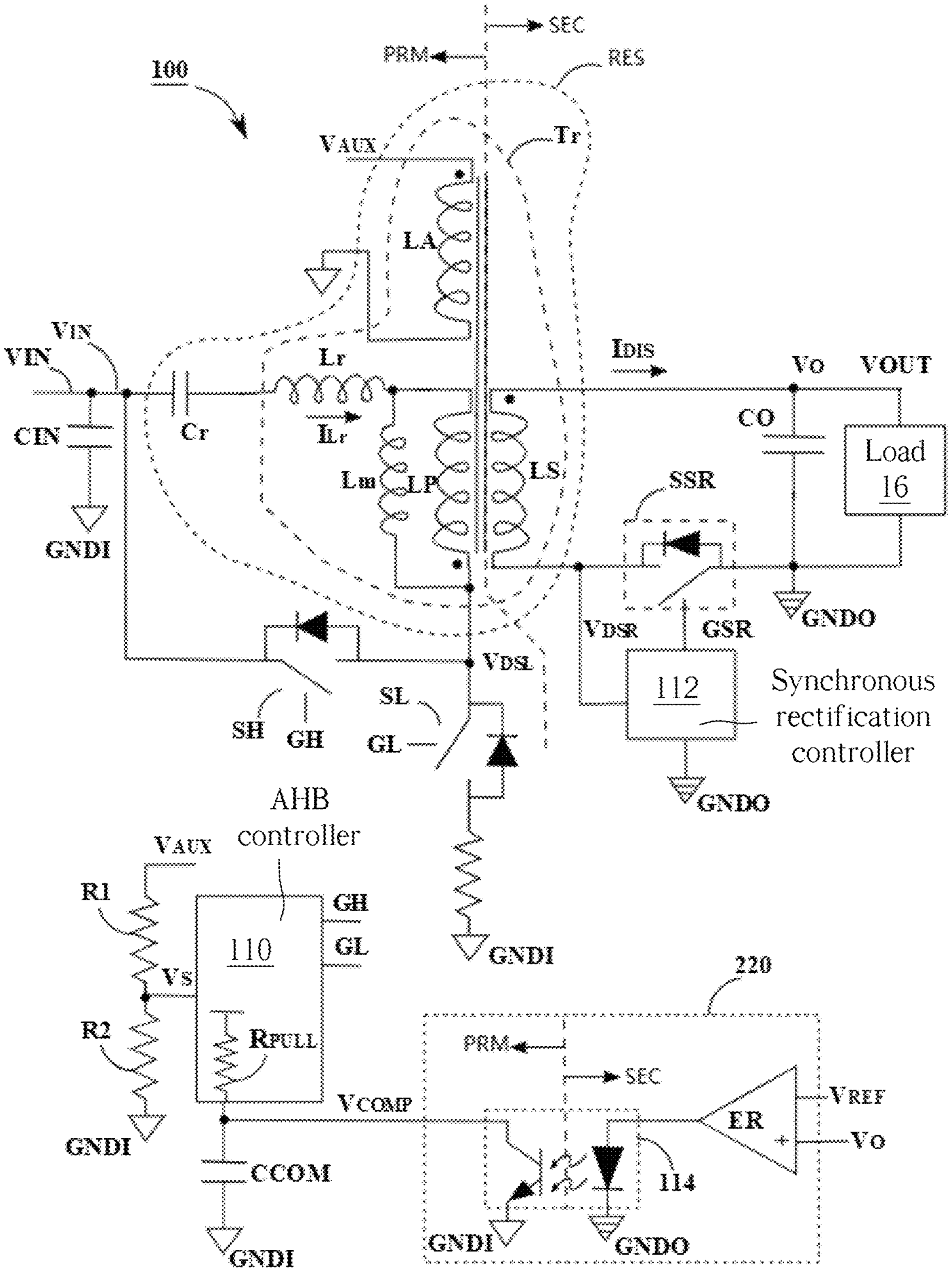
FIG. 1 illustrates an AHB power supply according to an embodiment of the present disclosure.

FIG. 1 shows an AHB power supply 100 according to an embodiment of the disclosure. In a primary side PRM, an input capacitor CIN can be disposed between the input power line VIN and an input ground line GNDI, and an input voltage $V_{IN}$ can be provided. A transformer Tr and an oscillating capacitor Cr can form a resonant circuit RES and be coupled to an upper arm switch SH and a lower arm switch SL. The upper arm switch SH and the lower arm switch SL can form a half bridge, be in series between the input power line VIN and the input ground line GNDI, and control the resonant circuit RES. The transformer Tr can include a primary winding LP, a secondary winding LS, and an auxiliary winding LA inductively coupled to each other. In FIG. 1, a series leakage inductance Lr and a parallel leakage inductance Lm can respectively represent the inductances that are in series and parallel with the primary winding LP without having inductive coupling with other windings. The series leakage inductance Lr and the parallel leakage inductance Lm can be separate electronic components, or they can be parasitic inductances parasitic in the transformer Tr. The primary winding LP can be electrically connected to the oscillating capacitor Cr. According to a winding voltage $V_{AUX}$, resistors R1 and R2 in series can provide a detection signal VS to the AHB controller 110. The AHB controller 110 can detect the winding voltage $V_{AUX}$ of the auxiliary winding LA through the detection signal $V_S$, and provide control signals GH and GL to control the upper arm switch SH and the lower arm switch SL, respectively. A synchronous rectification switch SSR located at a secondary side SEC can be connected between the secondary winding LS and an output capacitor CO, and be controlled by a synchronous rectification controller 112. In an embodiment, the synchronous rectification controller 112 and the synchronous rectification switch SSR can be replaced with a rectifier diode. The AHB controller 110 can control the switching of the upper arm switch SH and the lower arm switch SL, so that the resonant circuit RES can draw electrical energy from an input power providing the input voltage $V_{IN}$. The synchronous rectification controller 112 can implement the rectification function, allowing the transformer Tr to charge the output capacitor CO, establishing an output voltage VO across an output power line VOUT and an output ground line GNDO, and supplying power to the load 16.

The AHB power supply 100 shown in FIG. 1 is merely an example, and embodiments are not limited thereto. For example, in another AHB power supply of another embodiment, the resonant circuit RES can be coupled between the input ground line GNDI and a node between the upper arm switch SH and the lower arm switch SL. In another embodiment, the primary winding LP and the oscillating capacitor Cr, which are in series in the resonant circuit RES, can be interchanged.

The input voltage $V_{IN}$ can be an output voltage provided by a PFC power converter from the previous stage, or the input voltage $V_{IN}$ can be an output voltage generated after the mains electricity has been rectified by a bridge rectifier.

As shown in FIG. 1, the output voltage VO can be regulated by the feedback control provided by an optocoupler 114, which controls the electrical energy drawn from the input voltage $V_{IN}$ by the primary side PRM. An error amplifier ER on the secondary side SEC can compare the output voltage $V_O$ with a reference voltage $V_{REF}$, and can control a compensation signal $V_{COMP}$ on the compensation capacitor CCOM located at the primary side PRM by driving the optocoupler 114. FIG. 1 illustrates an example where the AHB controller 110 can have a pull-up resistor $R_{PULL}$ connected between a high voltage power supply and the compensation capacitor CCOM. In FIG. 1, when the output voltage $V_O$ is greater than the reference voltage $V_{REF}$, the diode in the optocoupler 114 can emit stronger light, the current flowing to the input ground wire GNDI can increase, the compensation signal $V_{COMP}$ can decrease over time, the resonant circuit RES can draw less electrical energy from the input power supply of the input voltage VIN, the transformer Tr can charge the output capacitor CO less, thereby reducing the output voltage $V_O$ to approach the reference voltage $V_{REF}$. In this way, the output voltage $V_O$ can be approximately stabilized at the reference voltage $V_{REF}$. In addition, changes in a current $I_{OUT}$ drawn by the load may also indirectly affect the compensation signal $V_{COMP}$. When the current IOUT drawn by the load decreases, the output voltage $V_O$ may rise accordingly, and the compensation signal $V_{COMP}$ may decrease over time. When the current $I_{OUT}$ drawn by the load increases, the output voltage VO may drop accordingly, and the compensation signal $V_{COMP}$ may increase over time.

Figure 2:
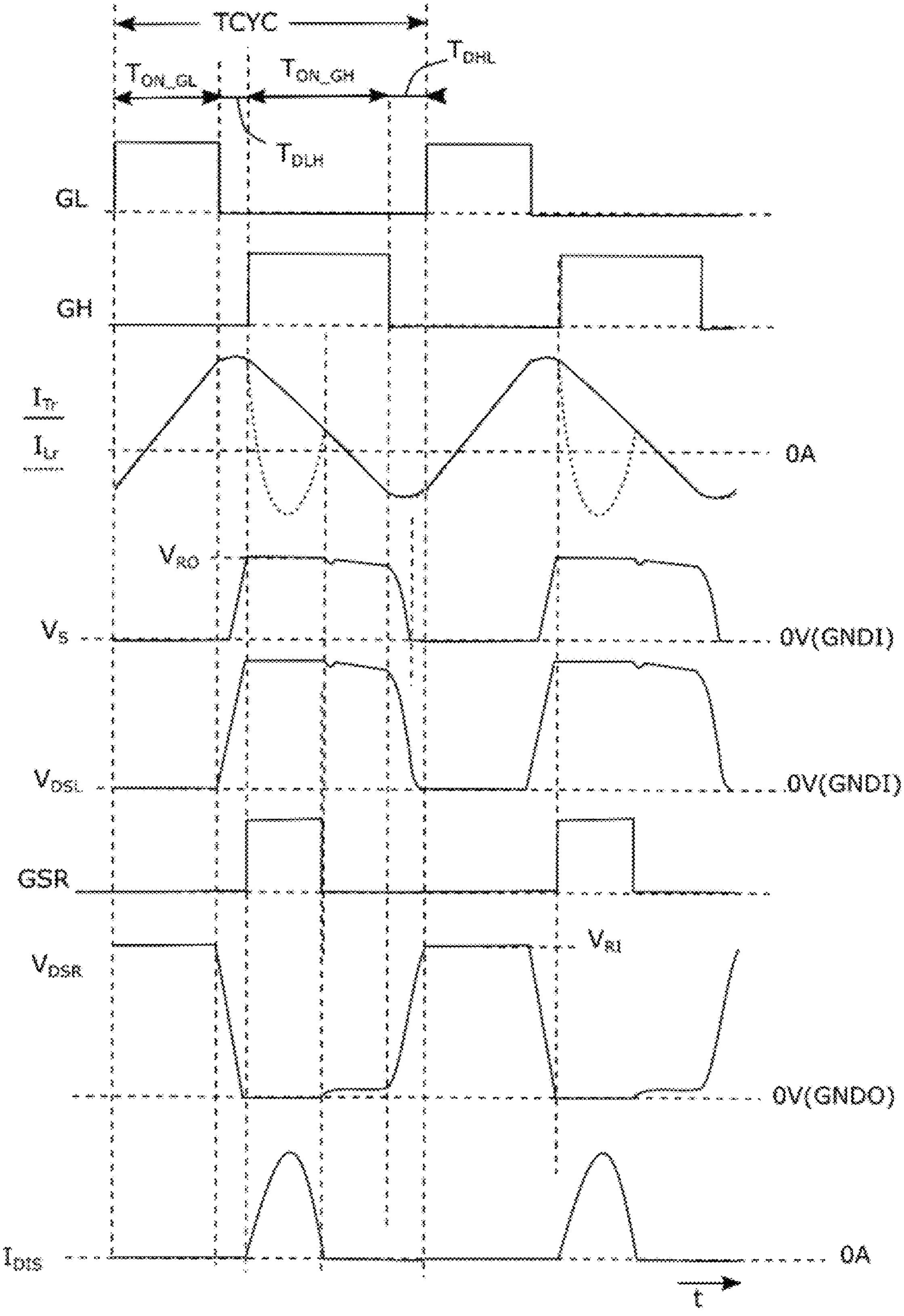
FIG. 2 illustrates the signal waveform of the AHB power supply in FIG. 1 operating in CRM.

FIG. 2 illustrates some signal waveforms when the AHB power supply 100 in FIG. 1 is operated in CRM mode. From top to bottom, FIG. 2 shows a control signal GL, a control signal GH, an excitation current $I_{Tr}$, a leakage current $I_{Lr}$ flowing through a series leakage inductor Lr, a detection signal $V_S$, a switch voltage $V_{DSL}$ at the node between the upper arm switch SH and the lower arm switch SL, a synchronous rectification control signal GSR, a switch voltage $V_{DSR}$ at the node between the synchronous rectification switch SSR and the secondary winding LS, and a discharge current $I_{DIS}$ charging the output capacitor CO from the secondary winding LS. The switch voltage $V_{DSL}$ can be equivalent to a channel voltage of the lower arm switch SL. FIG. 2 shows two consecutive switching cycles, each of which approximately starts shortly after the excitation current $I_{Tr}$ is about 0 A, and the two cycles can be the switching cycles when the AHB power supply 100 operates in CRM.

As shown in FIG. 2, at the beginning of a switching cycle TCYC, the AHB controller 110 can turn on the lower arm switch SL for a lower arm turn-on time $T_{ON\_GL}$ using the control signal GL. The duration of the lower arm turn-on time $T_{ON\_GL}$ can be determined by the compensation signal $V_{COMP}$. After the end of the lower arm turn-on time $T_{ON\_GL}$, there can be a deadtime $T_{DLH}$, during which both the upper arm switch SH and the lower arm switch SL are simultaneously turned off. After the deadtime $T_{DLH}$, the control signal GH can turn on the upper arm switch SH for an upper arm turn-on time $T_{ON\_GH}$. The duration of the upper arm turn-on time $T_{ON\_GH}$ can be automatically adjusted based on whether the lower arm switch SL has performed ZVS at the beginning of the lower arm turn-on time $T_{ON\_GL}$. After the end of the upper arm turn-on time $T_{ON\_GH}$, there can be a deadtime TDHL, during which both the upper arm switch SH and the lower arm switch SL can be simultaneously turned off. In an embodiment, the duration of the deadtime TDHL can be adjusted by the AHB controller 110 based on whether the lower arm switch SL has performed ZVS. The next switching cycle can begin after the end of the deadtime TDHL, as shown in FIG. 2.

Figure 3:
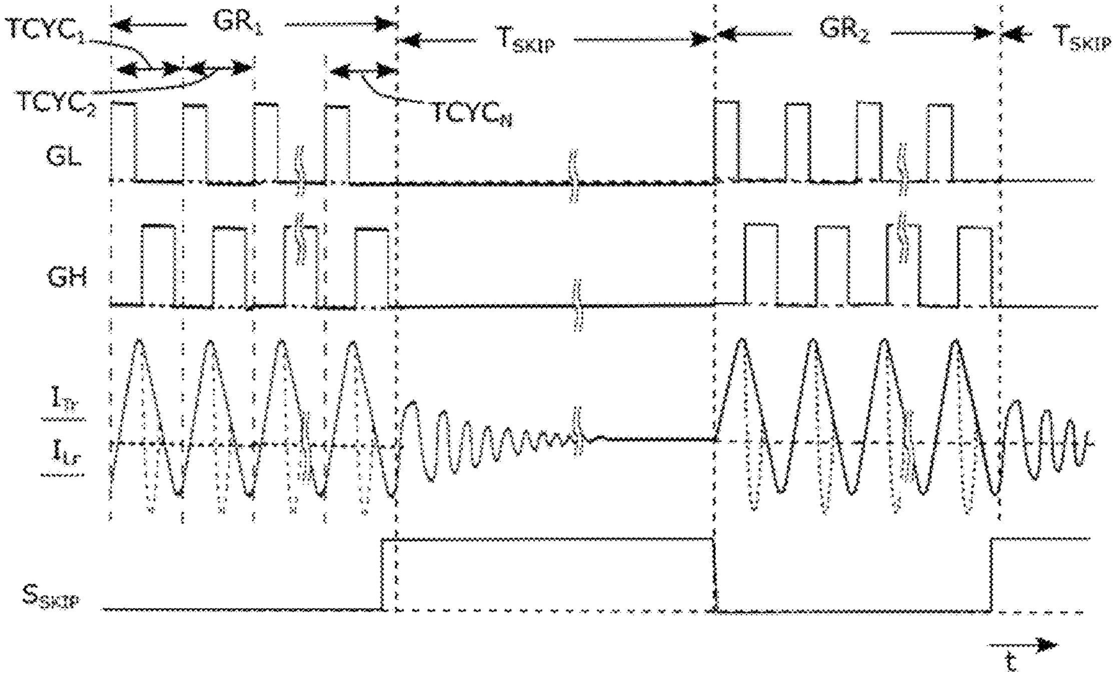
FIG. 3 illustrates the signal waveform of the AHB power supply according to an embodiment of the present disclosure operating in a burst mode.

FIG. 3 shows some signal waveforms when the AHB power supply 100 is operated in a burst mode according to an embodiment. As shown in FIG. 3, the AHB controller 110 can provide the burst mode. In the burst mode, the AHB controller 110 can be configured to be operated in switch operation periods $GR_1$ and $GR_2$. The switch operation periods $GR_1$ and $GR_2$ can each include at least one switching cycle, and the lower arm switch SL and the upper arm switch SH can be only turned on once in each switching cycle. As illustrated in FIG. 3, the switch operation period $GR_1$ can includes N switching cycles $TCYC_1$~$TCYC_N$. The internal part of the AHB controller 110 can provide a skip signal $S_{SKIP}$ to end a switch operation period and start a skip time $T_{SKIP}$, as shown in FIG. 3. From the end of the switch operation period $GR_1$, the AHB controller 110 can be configured to keep the upper arm switch SH and the lower arm switch SL continuously off during the skip time $T_{SKIP}$, until the switch operation period $GR_2$ begins. In each switching cycle in FIG. 3, the AHB controller 110 will automatically adjust the length of the upper arm turn-on time $T_{ON\_GH}$ based on whether the lower arm switch SL has performed ZVS at the beginning of the lower arm turn-on time $T_{ON\_GL}$, so that the lower arm switch SL can perform ZVS at the start of the next switching cycle. In other words, the AHB controller 110 can automatically adjust the length of the upper arm turn-on time $T_{ON\_GH}$ to ensure that the lower arm switch SL can approximately perform ZVS in each switching cycle in FIG. 3. In each switching cycle in FIG. 3, the AHB power supply 100 can be approximately operated in CRM, as previously explained in FIG. 2.

Figure 4:
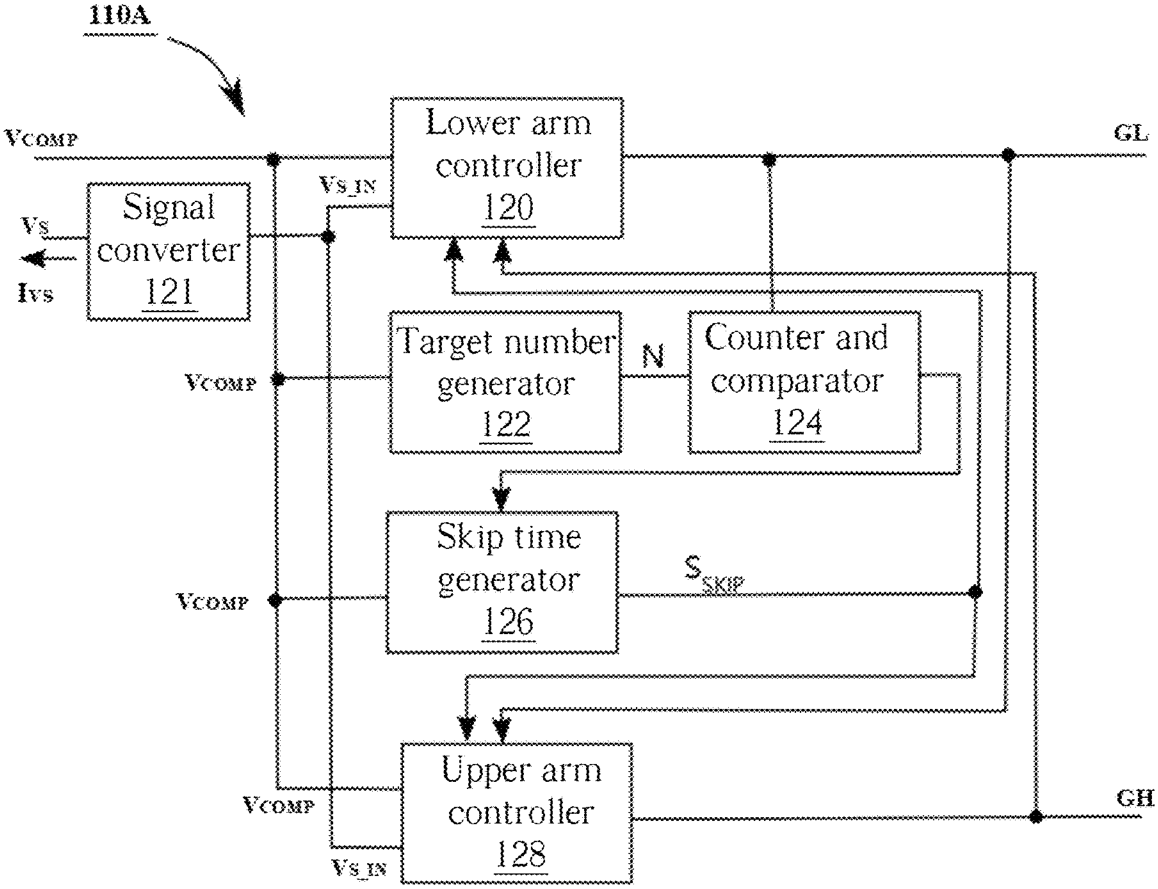
FIG. 4 illustrates an AHB controller according to an embodiment of the present disclosure.
Figure 5:
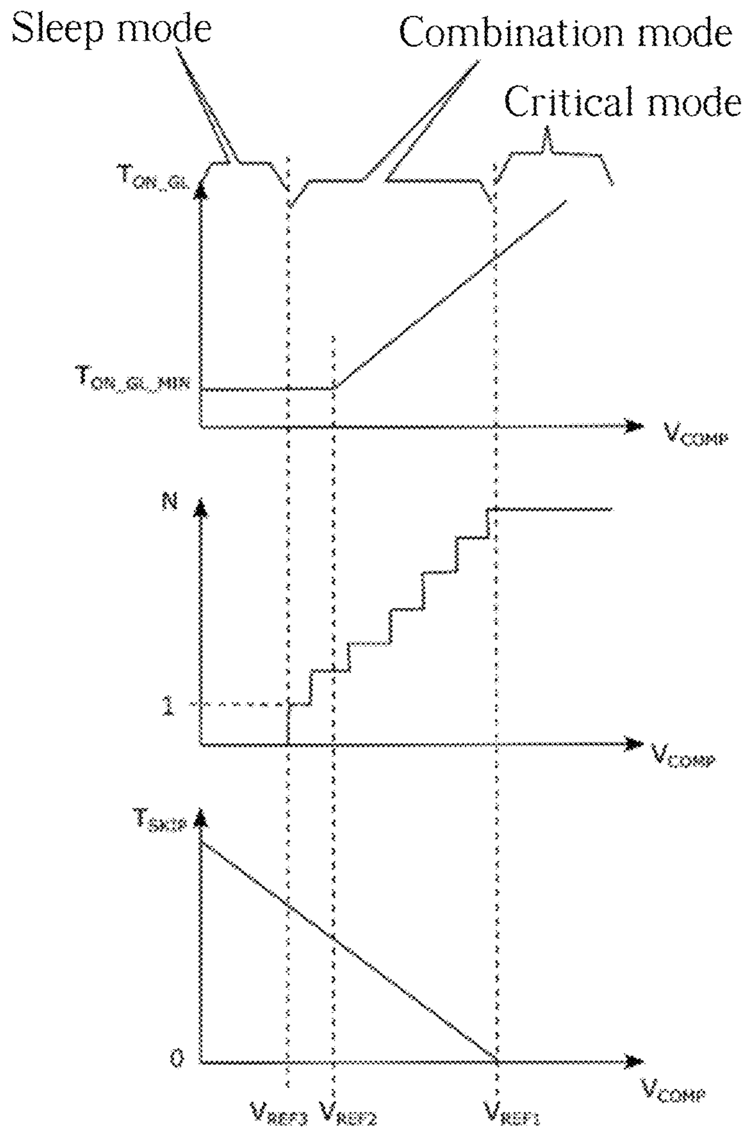
FIG. 5 illustrates the relationships between the lower arm turn-on time $T_{ON\_GL}$ and the compensation signal $V_{COMP}$, the target number N and the compensation signal $V_{COMP}$, and the skip time $T_{SKIP}$ and the compensation signal $V_{COMP}$.

FIG. 4 shows an AHB controller 110A according to an embodiment. The AHB controller 110A shown in FIG. 4 can serve as the AHB controller 110 in FIG. 1. The AHB controller 110A can include a signal converter 121, a lower arm controller 120, a target number generator 122, a counter and comparator 124, a skip time generator 126, and an upper arm controller 128. FIG. 5 can show the relationship between the lower arm turn-on time $T_{ON\_GL}$ and the compensation signal $V_{COMP}$, the relationship between the target number N and the compensation signal $V_{COMP}$, and the relationship between the skip time $T_{SKIP}$ and the compensation signal $V_{COMP}$. These relationships can be applicable in the AHB controller 110A of FIG. 4.

FIG. 5 also illustrates that with the variation of the compensation signal $V_{COMP}$, the AHB controller 110A can cause the AHB power supply 100 to operate in different modes. When the compensation signal $V_{COMP}$ exceeds the reference voltage $V_{REF1}$ (i.e., the first preset reference value), the load can be considered as a heavy load, and the AHB power supply 100 can operate substantially in CRM (i.e., the AHB controller 110A provides the critical mode). When the compensation signal $V_{COMP}$ is between the reference voltage $V_{REF1}$ and a reference voltage $V_{REF3}$ (i.e., a third preset reference value), the AHB power supply 100 can operate substantially in CRM and the burst mode (i.e., the AHB controller 110A provides a combination mode of the critical mode and the burst mode (CRM+Burst)). When the compensation signal $V_{COMP}$ is lower than the reference voltage $V_{REF3}$, it is considered that the load 16 does not exist, or it can be a no-load state, and the AHB power supply 100 can operate in a sleep mode (i.e., the AHB controller 110A provides the sleep mode), and the upper and lower arm switches can remain in an off state. In FIG. 5, a reference voltage $V_{REF2}$ (i.e., a second preset reference value) can be between the reference voltage $V_{REF1}$ and the reference voltage $V_{REF3}$.

The signal converter 121 in FIG. 4 can provide a detection current $I_{VS}$ when the winding voltage $V_{AUX}$ is a negative voltage, limiting the detection signal $V_S$ to 0V to provide an internal detection signal $V_{S\_IN}$. For example, the detection signal $V_{S\_IN}$ and the detection current $I_{VS}$ can have a proportional relationship.

In FIG. 4, the lower arm controller 120 can provides the control signal GL to start the lower arm turn-on time $T_{ON\_GL}$ based on the drop process of the winding voltage $V_{AUX}$ indicated by the detection signal $V_{S\_IN}$ within the deadtime $T_{DHL}$. The lower arm controller 120 can end the lower arm opening time $T_{ON\_GL}$ based on the compensation signal $V_{COMP}$. As shown in FIG. 5, the compensation signal $V_{COMP}$ can determine the length of the lower arm turn-on time $T_{ON\_GL}$. The higher the compensation signal $V_{COMP}$ is, the longer the lower arm turn-on time $T_{ON\_GL}$. When the compensation signal $V_{COMP}$ is lower than the reference voltage $V_{REF2}$, the lower arm turn-on time $T_{ON\_GL}$ can be a fixed time that does not change with the compensation signal $V_{COMP}$. This fixed time can be the minimum turn-on time $T_{ON\_GL\_MIN}$ preset by the lower arm controller 120.

The target number generator 122 can determine a target number N based on the compensation signal $V_{COMP}$ and provide the determined target number N to the counter and comparator 124, as shown in FIG. 5. In a burst mode (i.e., when the compensation signal $V_{COMP}$ is between the reference voltages $V_{REF1}$ and $V_{REF3}$), the output voltage $V_O$ can increase, the compensation signal $V_{COMP}$ can decrease (i.e., the intensity of the compensation signal $V_{COMP}$ can decreases), and the target number N can decrease, where a minimum value of the target number N can be 1. In the sleep mode (i.e., when the compensation signal $V_{COMP}$ is less than the reference voltage $V_{REF3}$), the target number N can be 0, so both the upper arm switch SH and the lower arm switch SL can remain in the off state.

The counter and comparator 124 can count the number of switching cycles that have already occurred in the current switch operation period based on the control signal GL. When the number of switching cycles in the current switch operation period is greater than or equal to the target number N (for example, the target number N can be greater than or equal to 2), the counter and comparator 124 can trigger the skip time generator 126 to generate the skip signal $S_{SKIP}$, approximately defining the skip time $T_{SKIP}$.

Based on the compensation signal $V_{COMP}$, the skip signal $S_{SKIP}$ can cause the lower arm controller 120 to remain off for the skip time $T_{SKIP}$ before starting another switching operation, then initiating a new switching cycle for the lower arm controller 120, and resetting the count of the counter and comparator 124. Basically, the larger the compensation signal $V_{COMP}$, the shorter the skip time $T_{SKIP}$. As shown in FIG. 5, when the compensation signal $V_{COMP}$ exceeds the reference voltage $V_{REF1}$, the skip time $T_{SKIP}$ can be 0, and it is no longer operated in the burst mode. As the output voltage $V_O$ increases, the compensation signal $V_{COMP}$ can decrease, and the skip time $T_{SKIP}$ can lengthen.

Figure 6A:
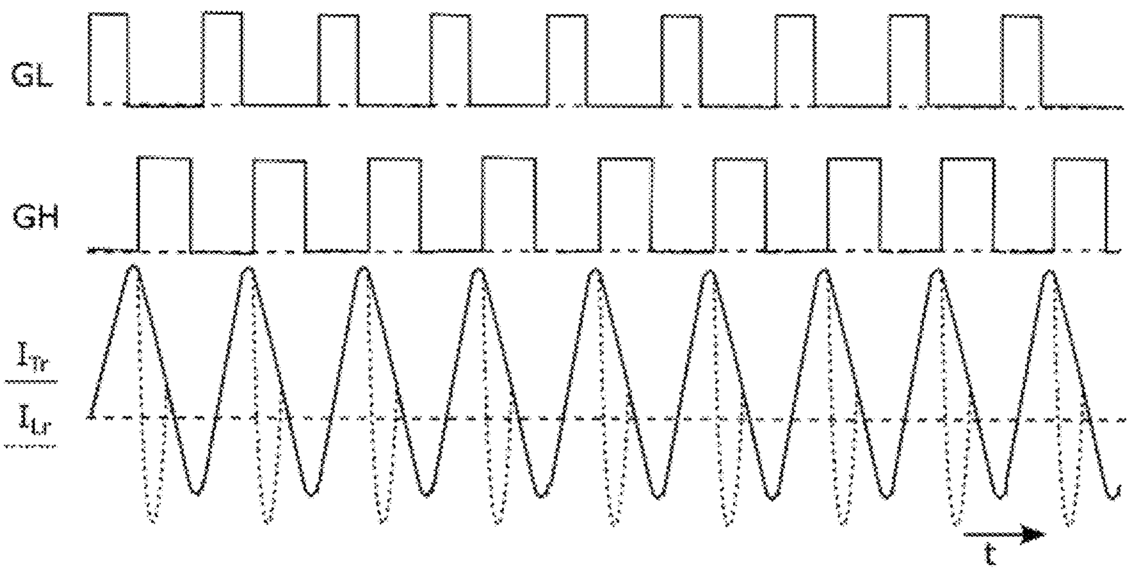
FIG. 6A illustrates the signal waveform of the AHB power supply in FIG. 1 operating in CRM when the compensation signal $V_{COMP}$ exceeds the reference voltage $V_{REF1}$.

FIG. 6A shows signal waveforms when the compensation signal $V_{COMP}$ exceeds the reference voltage $V_{REF1}$, the AHB power supply 100 is operated approximately in CRM. As previously mentioned, when the compensation signal $V_{COMP}$ exceeds the reference voltage $V_{REF1}$, the skip time $T_{SKIP}$ can be 0, and the AHB controller 110A can operate without the skip time $T_{SKIP}$. Therefore, regardless of what the target number N is, in FIG. 6A, one switching cycle can immediately follow the earlier switching cycle. In each switching cycle, the transformer Tr can be approximately operated in CRM, and the lower arm turn-on time $T_{ON\_GL}$ in each switching cycle can roughly vary with the compensation signal $V_{COMP}$. In each switching cycle, the length of the upper arm turn-on time $T_{ON\_GH}$ can be adjusted according to whether the lower arm switch SL has performed ZVS.

Figure 6B:
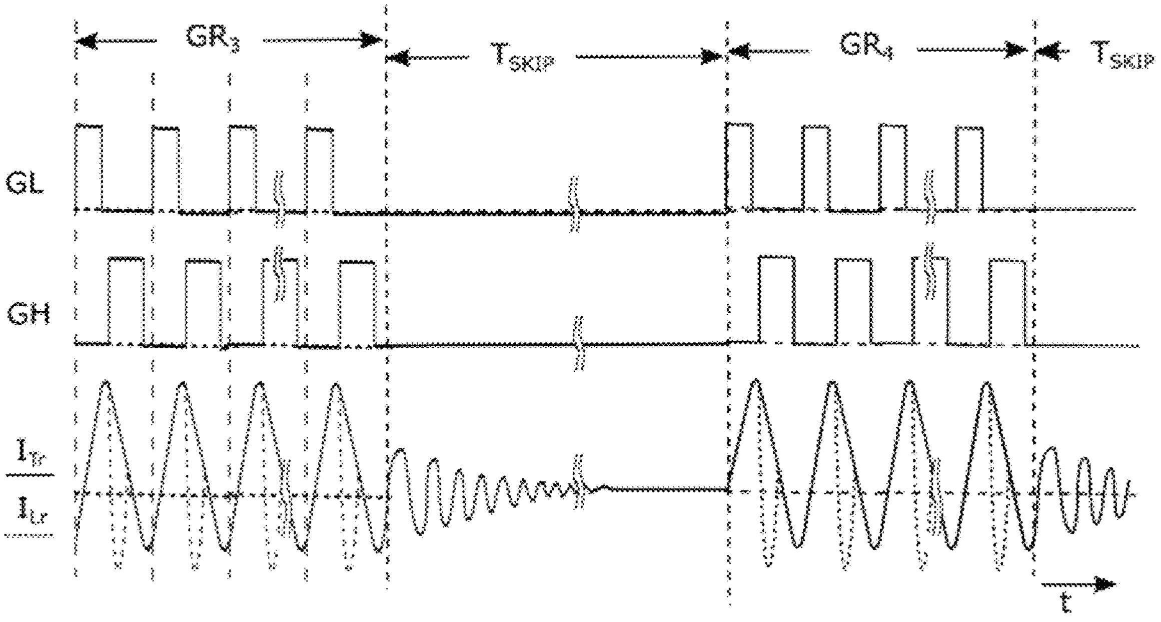
FIG. 6B illustrates the AHB power supply in FIG. 1 operating in CRM and the burst mode when the compensation signal $V_{COMP}$ is between the reference voltages $V_{REF1}$ and $V_{REF3}$.

FIG. 6B shows that when the compensation signal $V_{COMP}$ is between the reference voltages $V_{REF1}$ and $V_{REF3}$, the AHB power supply 100 can operate approximately in CRM and provide the burst mode. As previously mentioned, when the compensation signal $V_{COMP}$ is lower than the reference voltage $V_{REF1}$, the skip time $T_{SKIP}$ can start to be not equal to 0. Hence, as shown in FIG. 6B, after the number of switching cycles within the switch operation period $GR_3$ is the same as the target number N, the operation can stop for the skip time $T_{SKIP}$ before starting the switch operation period $GR_4$. In each switching cycle, the circuit can be approximately operated in CRM. In each switching cycle, the lower arm turn-on time $T_{ON\_GL}$ can roughly vary with the compensation signal $V_{COMP}$. In each switching cycle, the length of the upper arm turn-on time $T_{ON\_GH}$ can be adjusted based on whether the lower arm switch SL has performed ZVS.

Figure 7:
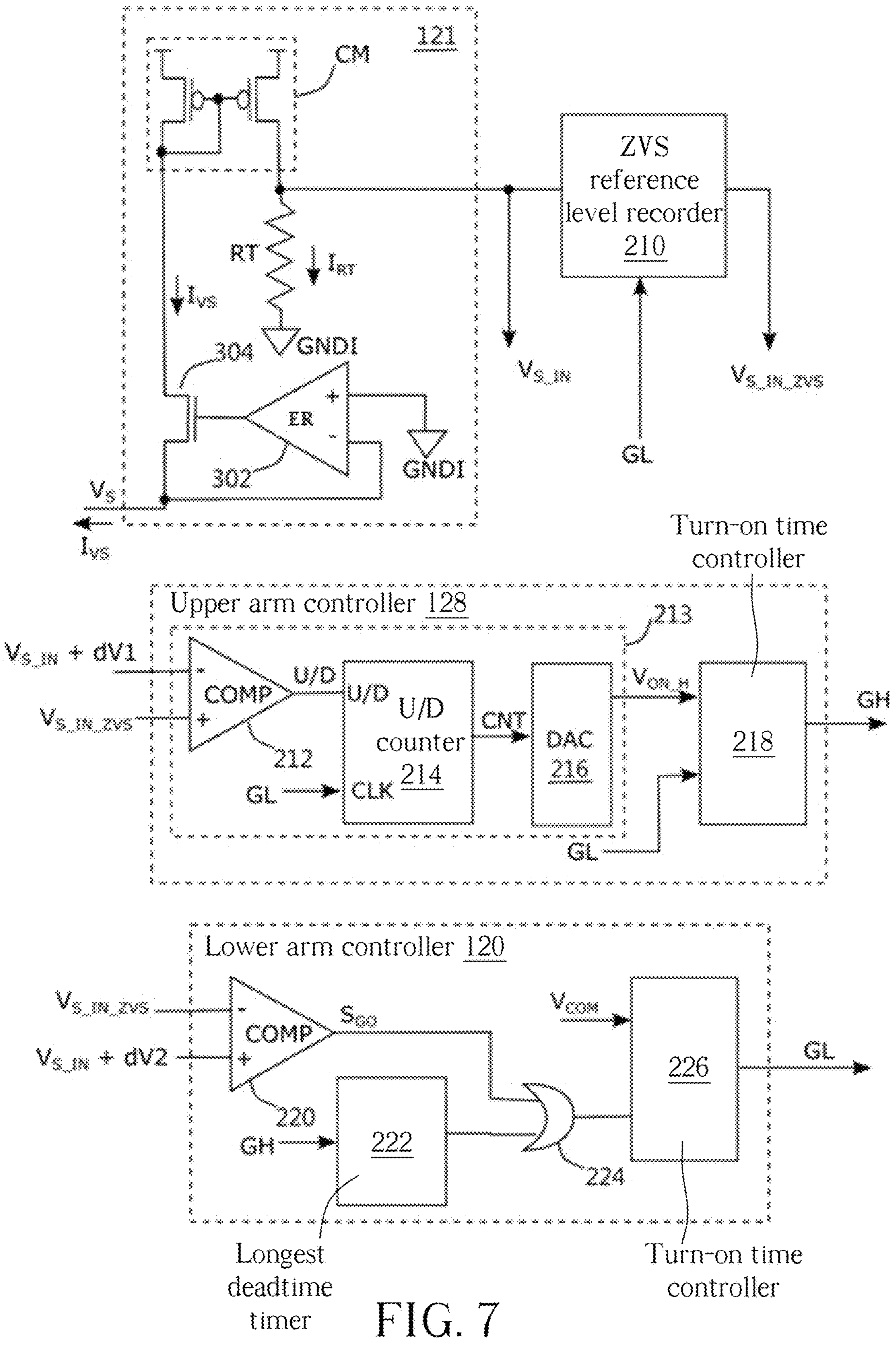
FIG. 7 illustrates the signal converter, lower arm controller, and upper arm controller in FIG. 4.

FIG. 7 shows the signal converter 121, the lower arm controller 120, and upper arm controller 128 in FIG. 4. FIG. 7 illustrates that how the upper arm turn-on time $T_{ON\_GH}$ and deadtime $T_{DHL}$ can be automatically adjusted based on whether the lower arm switch SL has performed ZVS.

The signal converter 121 can detect the signal $V_S$, detect the winding voltage $V_{AUX}$, and indirectly detect the switch voltage $V_{DSL}$ to provide the detection signal $V_{S\_IN}$. As shown in FIG. 7, the signal converter 121 can use an operational amplifier 302 and an NMOS switch 304 to control the detection signal $V_S$ to be not less than 0V. When the winding voltage $V_{AUX}$ is less than 0V, the NMOS switch 304 can provide the control current $I_{VS}$ to flow from the signal converter 121 to the auxiliary winding LA to maintain the detection signal $V_S$ at 0V. Therefore, the control current $I_{VS}$ can be approximately equal to |VAUX|/R1, where R1 can be the resistance value of a voltage divider resistor R1. A current mirror CM can provide a mirror current $I_{RT}$ being approximately proportional to the control current $I_{VS}$, and the mirror current $I_{RT}$ can flows through a resistor RT to generate the detection signal $V_{S\_IN}$. Therefore, the detection signal $V_{S\_IN}$ can approximately correspond to the winding voltage $V_{AUX}$ of the transformer Tr, and can also represent the switch voltage $V_{DSL}$ of the lower arm switch SL (where the switch voltage $V_{DSL}$ can be the voltage difference across the lower arm switch SL). When the switch voltage $V_{DSL}$ drops from a positive value to be closer to 0V, the winding voltage $V_{AUX}$ can become more negative, the control current $I_{VS}$ can become larger, and the detection signal $V_{S\_IN}$ can become higher.

In FIG. 7, a ZVS reference level recorder 210 can sample the detection signal $V_{S\_IN}$ at a preset time point within the lower arm turn-on time $T_{ON\_GL}$ to generate the ZVS reference level $V_{S\_IN\_ZVS}$. For example, at a time when the minimum turn-on time $T_{ON\_GL\_MIN}$ has passed after the start of the lower arm turn-on time $T_{ON\_GL}$, the ZVS reference level recorder 210 can sample the detection signal $V_{S\_IN}$ as the ZVS reference level $V_{S\_IN\_ZVS}$. In other words, what the ZVS reference level recorder 210 can record is a stable value of the detection signal $V_{S\_IN}$ when the lower arm switch SL is stably turned on and the switch voltage $V_{DSL}$ is equal to 0V. In short, the switch voltage $V_{DSL}$ can be approximately proportional to the difference between the detection signal $V_{S\_IN}$ and the ZVS reference level $V_{S\_IN\_ZVS}$.

In FIG. 7, the upper arm controller 128 can automatically adjust the upper arm turn-on time $T_{ON\_GH}$ based on whether the lower arm switch SL has performed ZVS. The upper arm controller 128 can include a ZVS detection circuit 213 and a turn-on time controller 218. The ZVS detection circuit 213 can include a comparator 212, a counter 214, and a digital-to-analog converter (DAC) 216. For example, the ZVS detection circuit 213 can include a recorder. The recorder can include a counter 214 and a digital-to-analog converter 216.

The ZVS detection circuit 213 can provide a duration parameter reflecting the upper arm turn-on time $T_{ON\_GH}$ of the upper arm switch SH in the earlier switching cycle, detect whether the lower arm switch SL has performed ZVS when the control signal GL is switched, and adjust the duration parameter in the later switching cycle accordingly.

For example, in the earlier switching cycle, regardless of whether the counter 214 incremented or decremented a count, the count can be obtained after counting. This count after counting can be a duration parameter with a digital form, which can reflect the upper arm turn-on time $T_{ON\_GH}$ of the upper arm switch SH in the earlier switching cycle. This duration parameter with the digital form can be converted into a duration parameter with an analog form through the digital-to-analog converter (DAC) 216, that is, an analog voltage $V_{ON\_H}$ obtained through the DAC 216. For example, the recorder in the ZVS detection circuit 213 can determine the adjusted duration parameter based on a comparison result U/D when a signal edge of the control signal GL occurs. The turn-on time controller 218 can start to turn on the upper arm switch SH at an appropriate time after the control signal GL turns off the lower arm switch SL, and the length of the upper arm turn-on time $T_{ON\_GH}$ can be determined based on the adjusted duration parameter (e.g., the adjusted analog voltage $V_{ON\_H}$).

For example, in a condition where the duration parameter reflecting the upper arm turn-on time ($T_{ON\_GH}$) of the upper arm switch SH in the earlier switching cycle is provided, if the lower arm switch SL has performed ZVS in the later switching cycle, the provided duration parameter can be reduced (i.e., the upper arm turn-on time $T_{ON\_GH}$ of the upper arm switch SH in the later switching cycle can be shortened); and if the lower arm switch SL has not performed ZVS in the later switching cycle, the provided duration parameter can be increased (i.e., the upper arm turn-on time $T_{ON\_GH}$ of the upper arm switch SH in the later switching cycle can be increased).

It should be understood that the above "earlier switching cycle" can refer to the earlier switching cycle of each later switching cycle, that is, for each later switching cycle, a duration parameter reflecting the upper arm turn-on time $T_{ON\_GH}$ of the upper arm switch SH in the earlier switching cycle can be provided.

It should be noted that, when the duration parameter reflecting the upper arm turn-on time ($T_{ON\_GH}$) of the upper arm switch SH in the earlier switching cycle is provided, within the later switching cycle, by detecting whether the lower arm switch SL has performed ZVS, a gradual fine-tuning (for example, step counting) can be performed based on the provided duration parameter to determine a more appropriate upper arm turn-on time $T_{ON\_GH}$. Compared to directly setting the length of the upper arm turn-on time ($T_{ON\_GH}$) of the upper arm switch SH in each switching cycle by detecting whether the lower arm switch SL has performed ZVS, it can more accurately determine the length of the upper arm turn-on time $T_{ON\_GH}$ of the upper arm switch SH that needs to be achieved in the later switching cycle for the lower arm switch SL to perform ZVS in the next switching cycle; as a result, it can effectively reduce switching losses and improve conversion efficiency.

The comparator 212 can compare the detection signal $V_{S\_IN}$ with the ZVS reference level $V_{S\_IN\_ZVS}$ to generate a comparison result U/D. For example, when the detection signal $V_{S\_IN}$ is approximately equal to the ZVS reference level $V_{S\_IN\_ZVS}$ (e.g., when the sum of the detection signal $V_{S\_IN}$ and a default value dV1 is not less than the ZVS reference level $V_{S\_IN\_ZVS}$), the comparison result U/D can be logically "0", indicating that the switch voltage $V_{DSL}$ of the lower arm switch SL should be close to 0V. Conversely, when the detection signal $V_{S\_IN}$ is significantly lower than the ZVS reference level $V_{S\_IN\_ZVS}$ (e.g., the sum of the detection signal $V_{S\_IN}$ and the default value dV1 is less than the ZVS reference level $V_{S\_IN\_ZVS}$), the comparison result U/D can be logically "1", indicating that the switch voltage $V_{DSL}$ of the lower arm switch SL should be noticeable.

The counter 214 can use the signal edge of the control signal GL for turning on the lower arm switch SL as the clock signal (i.e., the signal edge used to turn on the lower arm switch SL in response to the control signal GL), and based on the comparison result U/D, the counter 214 can increment or decrement a count, and output the count CNT. The signal edge of the control signal GL used to turn on the lower arm switch SL can turn on the lower arm switch SL, thereby causing the primary winding LP to start being charged and excited by the input voltage $V_{IN}$, and also causing the auxiliary winding voltage $V_{AUX}$ to be controlled at a fairly negative voltage, and causing the detection signal $V_{S\_IN}$ to rise to a high level, which is approximately the ZVS reference level $V_{S\_IN\_ZVS}$. However, due to signal propagation delay, there is a time difference from the signal edge of the control signal GL turning on the lower arm switch SL to the time when the winding voltage $V_{AUX}$ is fully controlled. However, according to the comparison result U/D and the control signal GL, the counter 214 can determine whether the voltage across the two terminals of the lower arm switch SL is close to 0 approximately before the lower arm switch SL is turned on (i.e. before the abovementioned time difference), where the voltage across the lower arm switch SL can be the switch voltage $V_{DSL}$, and the voltage across the lower arm switch SL is close to 0 means that the difference between the detection signal $V_{S\_IN}$ and the ZVS reference level $V_{S\_IN\_ZVS}$ is not greater than the default value dV1. The above operation is equivalent to determining whether the lower arm switch SL has performed ZVS. Therefore, the counter 214 can change the count CNT based on whether the lower arm switch SL has performed ZVS. The count CNT can be used to determine the length of the upper arm turn-on time $T_{ON\_GH}$.

The digital-to-analog converter 216 can convert the count CNT to output an analog voltage $V_{ON\_H}$, and the analog voltage $V_{ON\_H}$ can determine the length of the upper arm turn-on time $T_{ON\_GH}$.

For example, at the moment when the lower arm switch SL is turned on (i.e. when the signal edge of the control signal GL occurs), if the comparison result U/D is "0", it indicates that the lower arm switch SL has performed ZVS. Therefore, the count CNT can be decreased, and the analog voltage $V_{ON\_H}$ can be decreased, reducing the upper arm turn-on time $T_{ON\_GH}$ afterwards. Conversely, at the moment when the lower arm switch SL is turned on, if the comparison result U/D is "1", it indicates that the lower arm switch SL has not yet performed ZVS. Therefore, the count CNT can be increased, the analog voltage $V_{ON\_H}$ can be increased, lengthening the upper arm turn-on time $T_{ON\_GH}$ afterwards.

In FIG. 7, the lower arm controller 120 can automatically determine the length of the deadtime $T_{DHL}$, and timely provide the control signal GL to start turning on the lower arm switch SL. The lower arm controller 120 can include a comparator 220, a longest deadtime timer 222, an OR gate 224, and an turn-on time controller 226."

Similar to the comparator 212, the comparator 220 can compare the detection signal $V_{S\_IN}$ with the ZVS voltage $V_{S\_IN\_ZVS}$ to generate a start signal SGO. In a design of an embodiment, if the lower arm switch SL has performed ZVS at the moment it is turned on, the comparison result U/D output by comparator 212 can change from a logical '1' to '0' approximately before the lower arm switch SL is fully turned on. The comparator 220 can be configured so that the time point of the logical change of the start signal SGO is earlier than the time point of the logical change of the comparison result U/D. For example, in FIG. 8, the default value dV1 can be 0.1V, and the default value dV2 can be 0.2V. Thus, within the deadtime $T_{DHL}$, as the winding voltage $V_{AUX}$ gradually decreases and the detection signal VS_IN gradually increases, the logical change of the comparison result U/D can occur later than the logical change of the start signal SGO.

Upon being informed of the logic change of the start signal SGO, after a predetermined delay time, the turn-on time controller 226 can trigger and turn on the lower arm switch SL to start the lower arm turn-on time $T_{ON\_GL}$, and determine the length of the lower arm turn-on time $T_{ON\_GL}$ based on the compensation signal $V_{COMP}$.

The longest deadtime timer 222 can start timing after the end of the upper arm turn-on time $T_{ON\_GH}$, providing a longest deadtime $T_{DEAD\_MAX}$. If the start signal SGO has not triggered the turn-on time controller 226, after the longest deadtime (TDEAD_MAX) has elapsed, the longest deadtime timer 222 can trigger the turn-on time controller 226 to start the lower arm turn-on time $T_{ON\_GL}$. The longest deadtime timer 222 can prevent the issue where the lower arm switch SL fails to perform ZVS, the start signal SGO of the comparator 220 cannot undergo any logical change, and the switching cycle cannot end. In other words, the longest deadtime timer 222 can ensure that the deadtime $T_{DHL}$ is not greater than the longest deadtime $T_{DEAD\_MAX}$.

As shown in FIG. 7, the ZVS reference level recorder 210 can sample the detection signal $V_{S\_IN}$ at a preset time point within the lower arm turn-on time $T_{ON\_GL}$ to generate the ZVS reference level $V_{S\_IN\_ZVS}$. The ZVS reference level $V_{S\_IN\_ZVS}$ can be a fixed value obtained from sampling. That is, the detection signal $V_{S\_IN}$ can be a continuous analog signal reflecting the real-time changes of the winding voltage $V_{AUX}$. Therefore, there is no need to perform an additional operation of "setting a sampling time point to sample the winding voltage and store the analog value" to obtain a signal reflecting the winding voltage $V_{AUX}$. This can avoid errors of the detection signal $V_{S\_IN}$ introduced by setting the sampling time point too early or too late.

In addition, the comparator 212, the comparator 220, and the counter 214 can be all digital circuits. The counter 214 can be triggered by the edge of the control signal GL to read the output value of the comparator 212 (i.e., 0 or 1), and then perform subsequent digital addition and subtraction operations. In this way, it is determined through the digital circuit whether the lower arm switch SL has performed ZVS in the later switching cycle. Compared with using an analog circuit to determine whether the lower arm switch SL has performed ZVS in the later switching cycle through an analog signal, it can reduce the interference caused by the fluctuation of the analog signal (e.g., voltage signal), thereby effectively improving the anti-interference effect of the power circuit.

Figure 8:
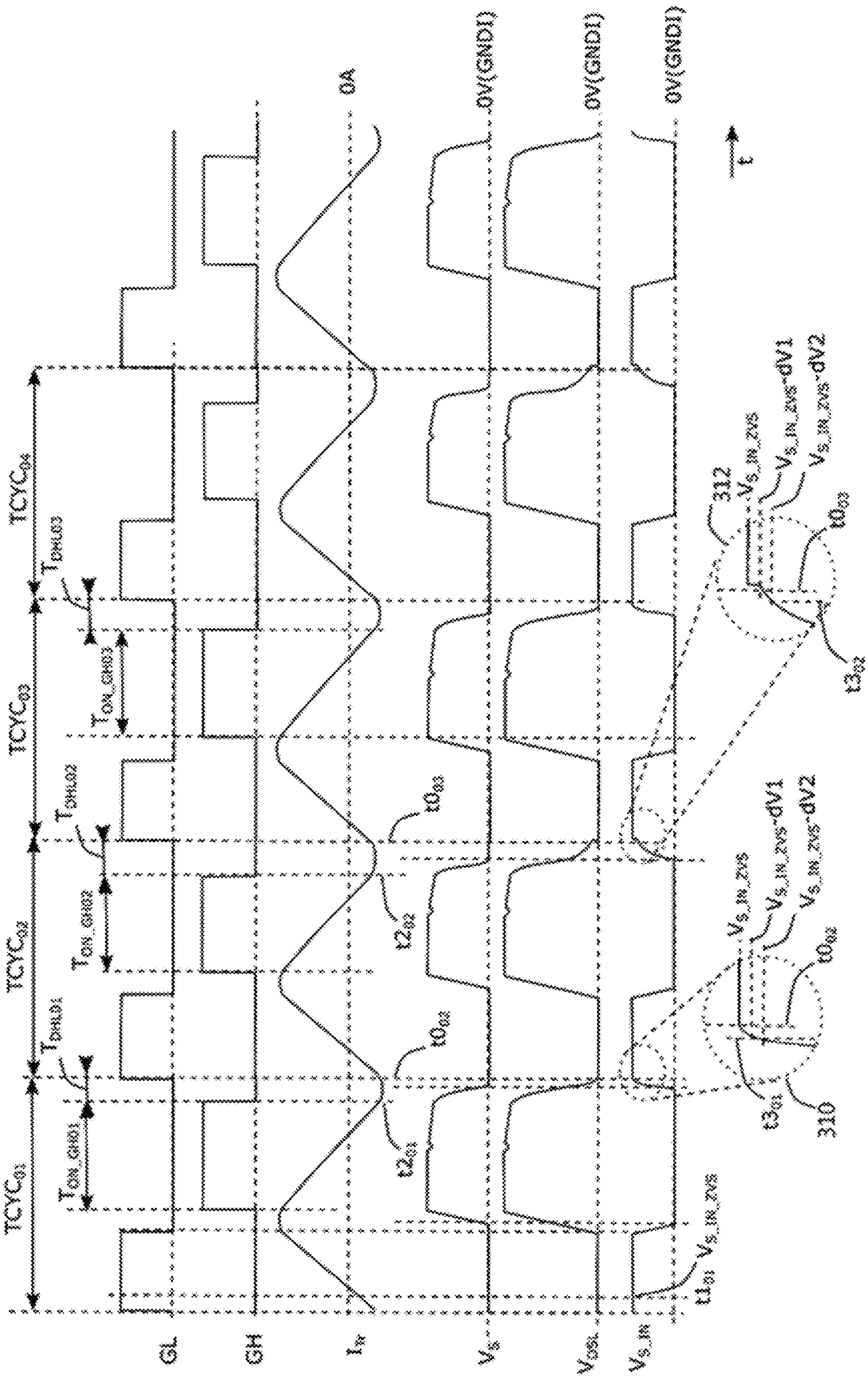
FIG. 8 illustrates the signal waveform of the AHB power supply in FIG. 1 during four steady-state switching cycles $TCYC_{01}$~$TCYC_{04}$.

FIG. 8 shows signal waveforms of four switching cycles $TCYC_{01}$~$TCYC_{04}$ when the AHB controller 110A is used in the AHB power supply 100 in a steady state (after the load 16 remains unchanged for a sufficiently long time). From top to bottom, the waveforms in FIG. 8 represent the control signal GL, the control signal GH, the excitation current $I_{Tr}$, the detection signal $V_S$, the switch voltage VDSL, and the detection signal $V_{S\_IN}$ in the AHB controller 110A.

Please refer to FIG. 8 and FIG. 7. Taking the switching cycle $TCYC_{01}$ as an example, the ZVS reference level recorder 210 can samples the detection signal $V_{S\_IN}$ at a time point t101 to generate the ZVS reference level $V_{S\_IN\_ZVS}$. Regardless of whether the lower arm switch SL has performed ZVS at the beginning of the switching cycle $TCYC_{01}$, the upper arm controller 128 can determine the length of the upper arm turn-on time $T_{ON\_GH01}$ based on the current count CNT. The deadtime $T_{DHL01}$ can start at a time point t2$_{01}$ and end at a time point t0$_{02}$. From the time point t2$_{01}$, the switch voltage $V_{DSL}$ and the detection signal $V_S$ can begin to decrease. When the detection signal $V_S$ is controlled to be 0V by the signal converter 121, the detection signal $V_{S\_IN}$ can begin to rise. The speed at which the detection signal $V_{S\_IN}$ rises is roughly related to the upper arm turn-on time $T_{ON\_GH01}$. Generally speaking, the longer the upper arm turn-on time $T_{ON\_GH01}$, the faster the detection signal $V_{S\_IN}$ rises during the deadtime $T_{DHL01}$, and the detection signal $V_{S\_IN}$ can also reach a higher peak.

In the partial diagram 310 of FIG. 8, the detection signal $V_{S\_IN}$ around the time point t002 (the starting point of the switching cycle $TCYC_{02}$) is magnified. At a time point t3$_{01}$, comparator 220 can be used to know that the detection signal $V_{S\_IN}$ is very close to the ZVS reference level $V_{S\_IN\_ZVS}$, and the difference is less than the default value dV2, so the logic level of the start signal SGO can begin to change, triggering the turn-on time controller 226. After a predetermined delay time following the time point t3$_{01}$, the turn-on time controller 226 can start turning on the lower arm switch SL with the control signal GL, and end the deadtime $T_{DHL01}$.

As can be seen from the partial diagram 310, during the period from the time point t3$_{01}$ to the time point t0$_{02}$, the detection signal $V_{S\_IN}$ has become closer to the ZVS reference level $V_{S\_IN\_ZVS}$, with a difference less than the default value dV1. Therefore, before the time point t002, the comparison result U/D, which is the output of comparator 212, can be a logical "0". This indicates that the voltage across the two terminals of the lower arm switch SL should be close to 0V, and it also indicates that at the beginning of the next switching cycle (i.e., the switching cycle $TCYC_{02}$), the lower arm switch SL can perform ZVS. Therefore, at the time point t0$_{02}$, the count CNT recorded by the counter 214 can decrease. The waveform of the switch voltage $V_{DSL}$ in FIG. 8 can also shows that the lower arm switch SL has performed ZVS at the beginning of the switching cycle $TCYC_{02}$ (i.e., the time point t0$_{02}$).

As shown in the partial diagram 310, detecting whether the first arm switch (e.g., lower arm switch) has performed ZVS when the edge of the control signal occurs, does not mean that the time point t3$_{01}$ (when the edge of the first control signal GL occurs), and the time point t0$_{02}$ (when the difference between the detection signal $V_{S\_IN}$ and the ZVS reference level $V_{S\_IN\_ZVS}$ is compared), occur at the same time. For example, there may be a delay time difference between the two time points. That is, "in response to the edge of the first control signal" or "triggered by the edge of the first control signal" described in this disclosure can be "when the edge of the first control signal occurs", or it can be "within a period of time after the edge of the first control signal occurs".

During the switching cycle $TCYC_{02}$, the ZVS reference level recorder 210 can timely sample the detection signal $V_{S\_IN}$ to generate the ZVS reference level $V_{S\_IN\_ZVS}$. The upper arm controller 128 can determine the length of the upper arm turn-on time $T_{ON\_GH02}$ based on the current count CNT. Because the current count CNT can be smaller than the count CNT in the switching cycle $TCYC_{01}$, the upper arm turn-on time $T_{ON\_GH02}$ can be shorter than the upper arm turn-on time $T_{ON\_GH01}$.

The deadtime $T_{DHL02}$ can start from a time point t2$_{02}$ and end at a time point t0$_{03}$. Starting from the time point t2$_{02}$, the switch voltage $V_{DSL}$ and the detection signal $V_S$ can begin to decrease. Compared to the detection signal $V_{S\_IN}$ during the deadtime $T_{DHL01}$, because the upper arm turn-on time $T_{ON\_GH02}$ can be shorter, the detection signal $V_{S\_IN}$ can rise slower during the deadtime $T_{DHL02}$, and the highest point it may reach is also lower. The slower rise speed of the detection signal $V_{S\_IN}$ also results in the deadtime $T_{DHL02}$ being longer than the deadtime $T_{DHL01}$.

The partial diagram 312 in FIG. 8 can magnify the detection signal $V_{S\_IN}$ around the time point $t0_{03}$ (i.e., the start of the switching cycle $TCYC_{03}$). At a time point $t3_{02}$, the comparator 220 can be used to detect that the detection signal $V_{S\_IN}$ is very close to the ZVS reference level $V_{S\_IN\_ZVS}$, the difference is less than the default value dV2, so the logical level of the start signal SGO can begin to change. After a predetermined delay time following the time point $t3_{02}$, that is, at the time point $t0_{03}$, the turn-on time controller 226 can begin to turn on the lower arm switch SL with the control signal GL and end the deadtime $T_{DHL02}$.

From the partial diagram 312, it can be observed that because the detection signal $V_{S\_IN}$ can rise more slowly during the deadtime $T_{DHL02}$, in the period from time point $t3_{02}$ to the time point t003, although the detection signal $V_{S\_IN}$ is closer to the ZVS reference level $V_{S\_IN\_ZVS}$, the difference between them is still greater than the default value dV1. Therefore, before the time point $t0_{03}$, the comparison result U/D can be logically "1", indicating that the switch voltage $V_{DSL}$ of the lower arm switch SL is not close enough to 0V, and also indicating that at the beginning of the next switching cycle (that is, the switching cycle $TCYC_{03}$), the lower arm switch SL fails to perform ZVS. Therefore, the count CNT recorded by the counter 214 can increase. The waveform of the switch voltage $V_{DSL}$ in FIG. 8 also shows that the lower arm switch SL almost performs ZVS at the beginning of the switching cycle $TCYC_{03}$.

In the switching cycle $TCYC_{03}$, the upper arm controller 128 can determine the length of the upper arm turn-on time $T_{ON\_GH03}$ based on the current count CNT. Because the current count CNT has increased compared to the count CNT in the switching cycle $TCYC_{02}$, the upper arm turn-on time $T_{ON\_GH03}$ can be longer than the upper arm turn-on time $T_{ON\_GH02}$, which also results in the deadtime $T_{DHL03}$ being shorter than the deadtime $T_{DHL02}$.

Therefore, as shown in FIG. 8, in the steady state, the upper arm turn-on time $T_{ON\_GH}$ of each switching cycle can vary slightly depending on whether the lower arm switch SL has performed ZVS at the beginning of this switching cycle. The length of the upper arm turn-on time $T_{ON\_GH}$ can be maintained just enough to allow the lower arm switch SL to perform ZVS at the beginning of the next switching cycle. In addition, the deadtime $T_{DHL}$ of each switching cycle can also end timely, allowing the lower arm switch SL to perform ZVS.

In a condition where the AHB controller 110A continuously detects that the lower arm switch SL has performed ZVS, the count CNT can gradually decrease with each switching cycle, slowly shortening the length of the upper arm turn-on time $T_{ON\_GH}$, and the lower arm controller 120 can also automatically gradually increase the deadtime $T_{DHL}$. Until it is detected that the lower arm switch SL starts to fail to perform ZVS, the AHB controller 110A can approximately maintain the lengths of the upper arm turn-on time $T_{ON\_GH}$ and the deadtime $T_{DHL}$.

If the upper arm turn-on time $T_{ON\_GH}$ is very short at the beginning, it will cause the lower arm switch SL to fail to perform ZVS, and even cause the detection signal $V_{S\_IN}$ to fail to increase to the ZVS reference level $V_{S\_IN\_ZVS}$−dV2, then it is more impossible to increase to the ZVS reference level $V_{S\_IN\_ZVS}$−dV1. In this case, the longest deadtime timer 222 in FIG. 7 can set the deadtime $T_{DHL}$ approximately equal to the preset longest deadtime $T_{DEAD\_MAX}$, and the count CNT recorded by the counter 214 can increase, causing the upper arm turn-on time $T_{ON\_GH}$ of the next switching cycle to increase. With each switching cycle, the count CNT can gradually increase, the length of the upper arm turn-on time $T_{ON\_GH}$ can gradually increase, and the deadtime $T_{DHL}$ can be kept approximately equal to the longest deadtime $T_{DEAD\_MAX}$. However, the detection signal $V_{S\_IN}$ climbs higher and higher during the deadtime $T_{DHL}$. Once the detection signal $V_{S\_IN}$ climbs above the ZVS reference level $V_{S\_IN\_ZVS}$−dV2 within the deadtime $T_{DHL}$, the deadtime $T_{DHL}$ will automatically end early and will no longer be the longest deadtime $T_{DEAD\_MAX}$. The length of the upper arm turn-on time $T_{ON\_GH}$ can gradually increase with each switching cycle until the detection signal $V_{S\_IN}$ climbs above the ZVS reference level $V_{S\_IN\_ZVS}$−dV1 within the deadtime $T_{DHL}$, and the lower arm switch SL has performed ZVS. After that, the length of the upper arm turn-on time $T_{ON\_GH}$ can remain approximately constant, as shown in FIG. 8.

Therefore, as mentioned above, the upper arm turn-on time $T_{ON\_GH}$ and the deadtime $T_{DHL}$ can be automatically calibrated to have appropriate lengths based on whether the lower arm switch SL has performed ZVS. The upper arm turn-on time $T_{ON\_GH}$ will not be too long to waste the electrical energy stored in the transformer Tr, nor will it be too short to prevent the lower arm switch SL from performing ZVS. The deadtime $T_{DHL}$ will also end in a timely manner when the lower arm switch SL can perform ZVS.

The counter 214 can record the count CNT in a digital format to approximately record the length that the upper arm turn-on time $T_{ON\_GH}$ should have. In the burst mode, after the time $T_{SKIP}$ has elapsed, the counter 214 can immediately provide an upper arm turn-on time $T_{ON\_GH}$ of a similar length, to maximize the possibility of the lower arm switch SL performing ZVS in the subsequent switching cycles.

Figure 9:
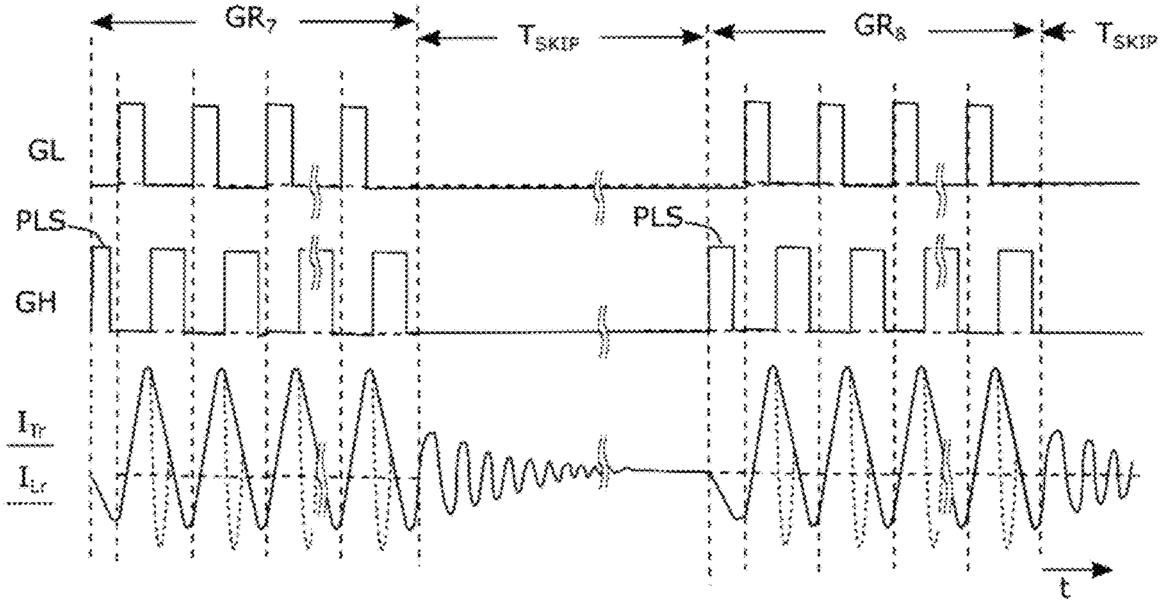
FIG. 9 illustrates the signal waveform of the AHB power supply in FIG. 1 operating in CRM and the burst mode.

In the burst mode, embodiments of the disclosure are not limited to having only one or several switching cycles during each switch operation period. In another embodiment, each switch operation period can include a pre-magnetization pulse PLS before at least one switching cycle begins. FIG. 9 shows signal waveforms according to another embodiment. The similarities between FIG. 9 and FIG. 6B can be known through previous explanations and will not be repeated. However, in FIG. 6B, after stopping operation for the skip time $T_{SKIP}$, the switch operation period can be directly started by the lower arm controller 120 for a new switching cycle. Differently, in FIG. 9, after the skip time $T_{SKIP}$, at the beginning of the switch operation period, a pre-magnetization pulse PLS can be generated first by the upper arm controller 128, and then multiple switching cycles can be started by the lower arm controller 120. As shown in FIG. 9, in switch operation periods $GR_7$ and $GR_8$, each switch operation period can begin with the pre-magnetization pulse PLS. For example, when the skip time generator 126 in FIG. 4 sends the skip signal $S_{SKIP}$ to notify that the skip time $T_{SKIP}$ should end, the upper arm controller 128 can issue the pre-magnetization pulse PLS according to the current count CNT, controlling the turn-on time controller 218 to generate the pre-magnetization pulse PLS. The pre-magnetization pulse PLS in FIG. 9 can first magnetize the transformer Tr, and then control the lower arm switch SL to perform ZVS within a first switching cycle of a switch operation period.

Figure 10:
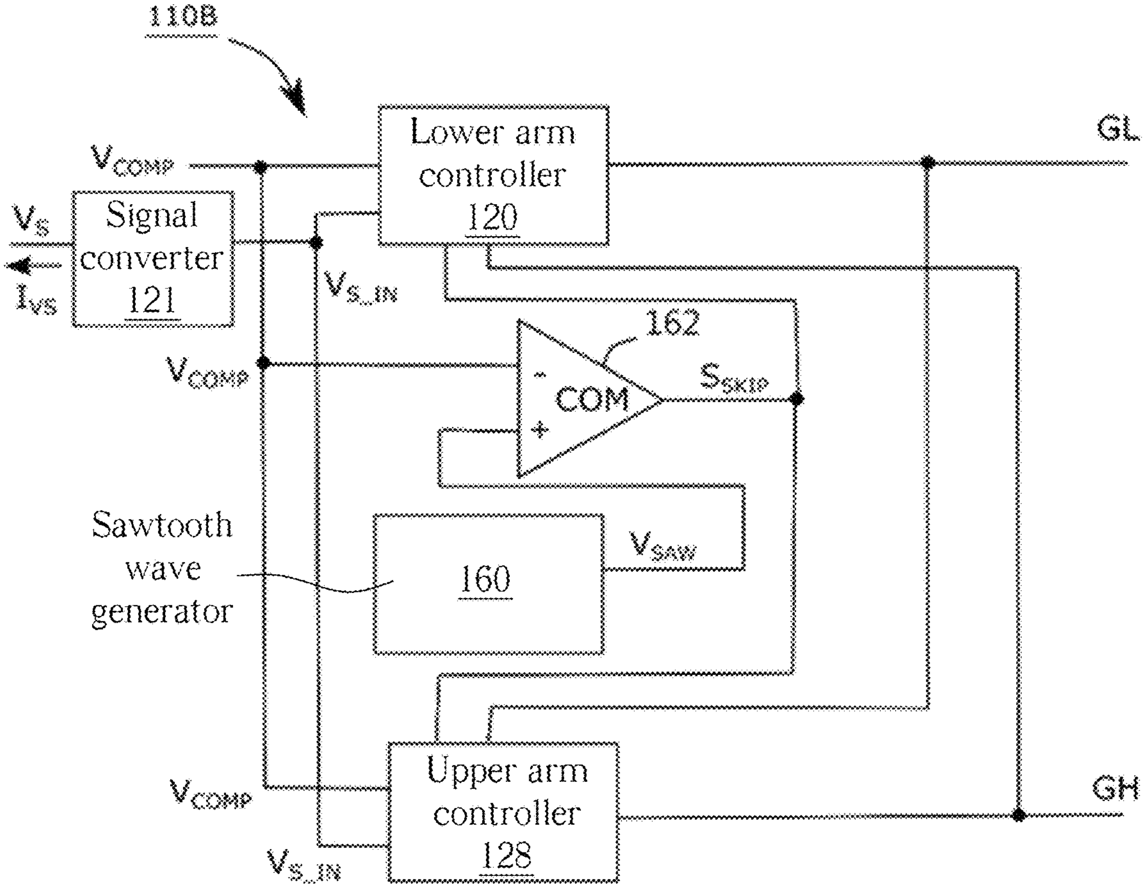
FIG. 10 illustrates an AHB controller according to an embodiment of the present disclosure.
Figure 11:
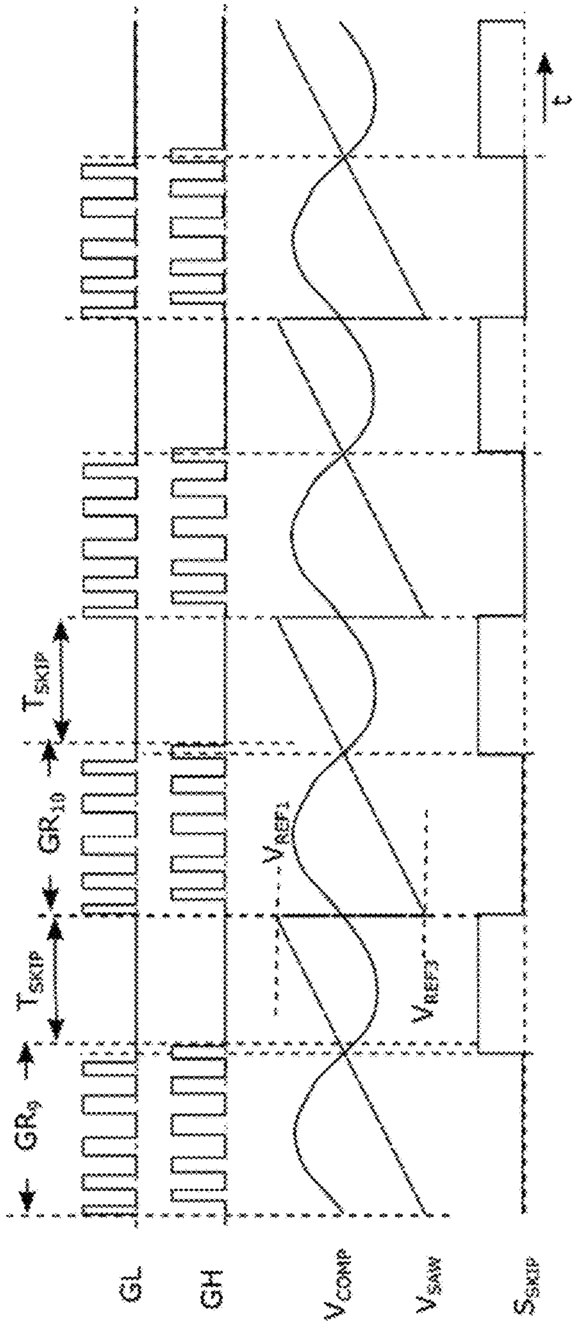
FIG. 11 and FIG. 12 show the signal waveforms generated when the AHB power supply in FIG. 1 uses the AHB controller in FIG. 10.

FIG. 10 illustrates an example of the AHB controller 110B, which includes a lower arm controller 120, a sawtooth wave generator 160, a comparator 162, and an upper arm controller 128. It can also be operated in the burst mode and CRM. FIG. 11 shows some possible signal waveforms when the AHB power supply 100 in FIG. 1 uses the AHB controller 110B. From top to bottom, FIG. 11 shows a control signal GL, a control signal GH, a sawtooth wave signal $V_{SAW}$, a compensation signal $V_{COMP}$, and a skip signal $S_{SKIP}$ according to an embodiment.

The operation and function of the lower arm controller 120 and the upper arm controller 128 can be understood through the previous description of the AHB controller 110A, and will not be repeated.

In an embodiment of the disclosure, the sawtooth wave generator 160 can provide a periodic sawtooth wave signal $V_{SAW}$, its maximum value is approximately equal to the reference voltage $V_{REF1}$, and the minimum value is approximately equal to the reference voltage $V_{REF3}$, as shown in FIG. 11. The comparator 162 can compare the sawtooth wave signal $V_{SAW}$ with the compensation signal $V_{COMP}$ to generate the skip signal $S_{SKIP}$. When the compensation signal $V_{COMP}$ is higher than the sawtooth wave signal $V_{SAW}$, the skip signal $S_{SKIP}$ can be logically "0", allowing the lower arm controller 120 and the upper arm controller 128 to alternately turn on the lower arm switch SL and the upper arm switch SH to have a set of switching cycles, where each switching cycle is approximately executed in CRM. As previously mentioned, in each switching cycle, the lower arm controller 120 can determine the length of the lower arm turn-on time $T_{ON\_GL}$ based on the compensation signal $V_{COMP}$. The upper arm controller 128 can adjust the upper arm turn-on time $T_{ON\_GH}$ based on whether the lower arm switch SL has performed ZVS at the beginning of a switching cycle, so that its length is just enough to let the lower arm switch SL perform ZVS. When the compensation signal $V_{COMP}$ is lower than the sawtooth wave signal $V_{SAW}$, the skip signal $S_{SKIP}$ is logically "1", so that the lower arm controller 120 no longer turns on the lower arm switch SL, as shown in FIG. 11. In general, when the skip signal $S_{SKIP}$ is logically "0", it is in a switch operation period; when the skip signal SSKIP is logically "1", it is approximately in the skip time $T_{SKIP}$. In FIG. 11, the switch operation periods $GR_9$ and $GR_{10}$ each have 5 switching cycles. For example, the frequency of the sawtooth wave signal $V_{SAW}$ can be approximately 400 Hz, and the switching frequency of the control signals GH and GL may be up to 100 KHz.

Figure 12:
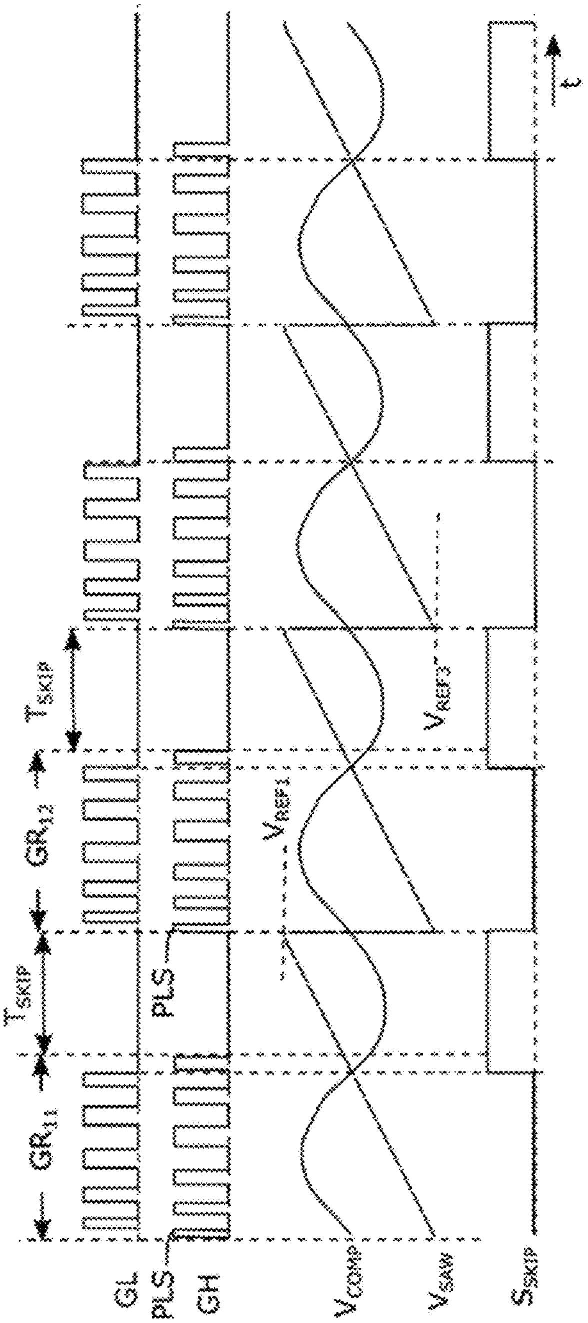

FIG. 12 shows the control signal GL, the control signal GH, the sawtooth wave signal $V_{SAW}$, the compensation signal $V_{COMP}$, and skip signal $S_{SKIP}$ in another embodiment. FIG. 12 is similar to FIG. 11. Different from FIG. 11, at the beginning of the switch operation periods GR11 and GR12 in FIG. 12, the control signal GH can first have a pre-magnetization pulse PLS, and then starts the subsequent switching cycles. As previously mentioned, the pre-magnetization pulse PLS may allow the lower arm switch SL to perform ZVS within the first switching cycle of the switch operation period.

As mentioned above, the AHB power supply of the embodiment of the disclosure can provide different operating modes according to the load reflected by the compensation signal $V_{COMP}$. When the compensation signal $V_{COMP}$ is high, indicating a heavy load, the AHB power supply can modulate the lower arm turn-on time $T_{ON\_GL}$ according to the compensation signal $V_{COMP}$, and operate the transformer approximately in continuous CRM. When the compensation signal $V_{COMP}$ is medium, indicating a medium load, the AHB power supply can still modulate the lower arm turn-on time $T_{ON\_GL}$ according to the compensation signal $V_{COMP}$, operate the transformer approximately in CRM, but also provides a burst mode, allowing the switch operation period to alternate with skip time. When the compensation signal $V_{COMP}$ is very low, indicating a no-load condition, the AHB power supply can enter a sleep mode, and both the upper and lower arm switches SH and SL can be fully turned off. In this way, the benefits of ZVS can be utilized under heavy and medium loads, and switching loss can be reduced under medium loads, thus improving conversion efficiency.

Figure 13:
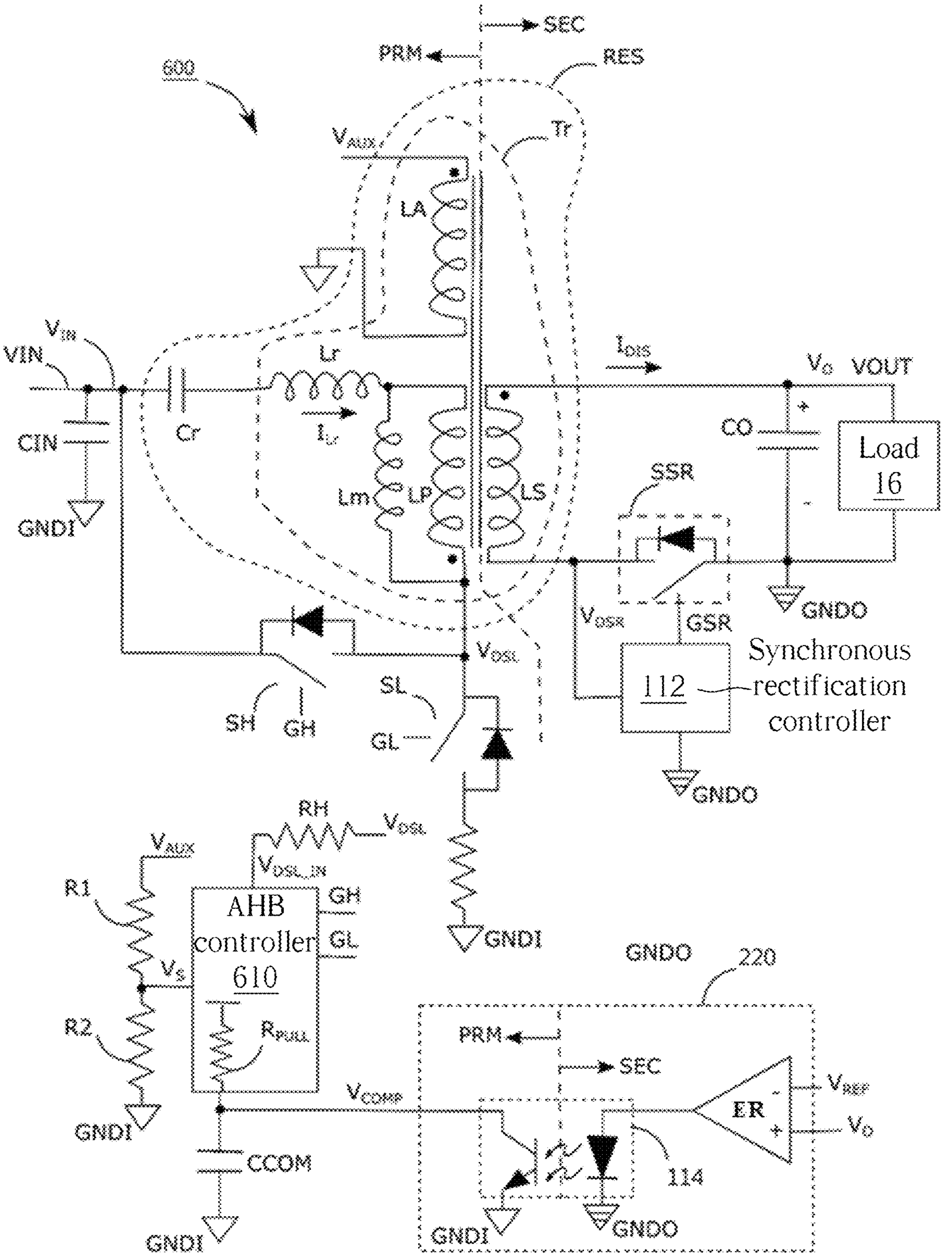
FIG. 13 illustrates another AHB power supply according to an embodiment of the present disclosure.

According to the embodiment of FIG. 1, the AHB controller 110 can detect the winding voltage $V_{AUX}$ through the detection signal $V_S$, indirectly detect the switch voltage $V_{DSL}$, and determine whether the lower arm switch SL has performed ZVS. However, embodiments of the disclosure are not limited thereto. FIG. 13 shows an AHB power supply 600 according to another embodiment of the disclosure. The similarities between the AHB power supply 600 and the AHB power supply 100 in FIG. 1 can be known from previous descriptions and will not be repeated. The AHB power supply 600 can also provide a burst mode, and can automatically and appropriately control the upper arm turn-on time $T_{ON\_GH}$ and the deadtime $T_{DHL}$ to allow the lower arm switch SL to approximately perform ZVS.

In the AHB power supply 600, the AHB controller 610 can additionally detect the switch voltage $V_{DSL}$ directly through the resistor RH to determine whether the lower arm switch SL has performed ZVS. When the current flowing through the resistor RH is small enough to be negligible, the voltage of the detection signal $V_{DSL\_IN}$ at the node between the AHB controller 610 and the resistor RH can be approximately equal to the switch voltage $V_{DSL}$. In another embodiment, the detection signal $V_{DSL\_IN}$ can be approximately the voltage division result of the switch voltage $V_{DSL}$.

Figure 14:
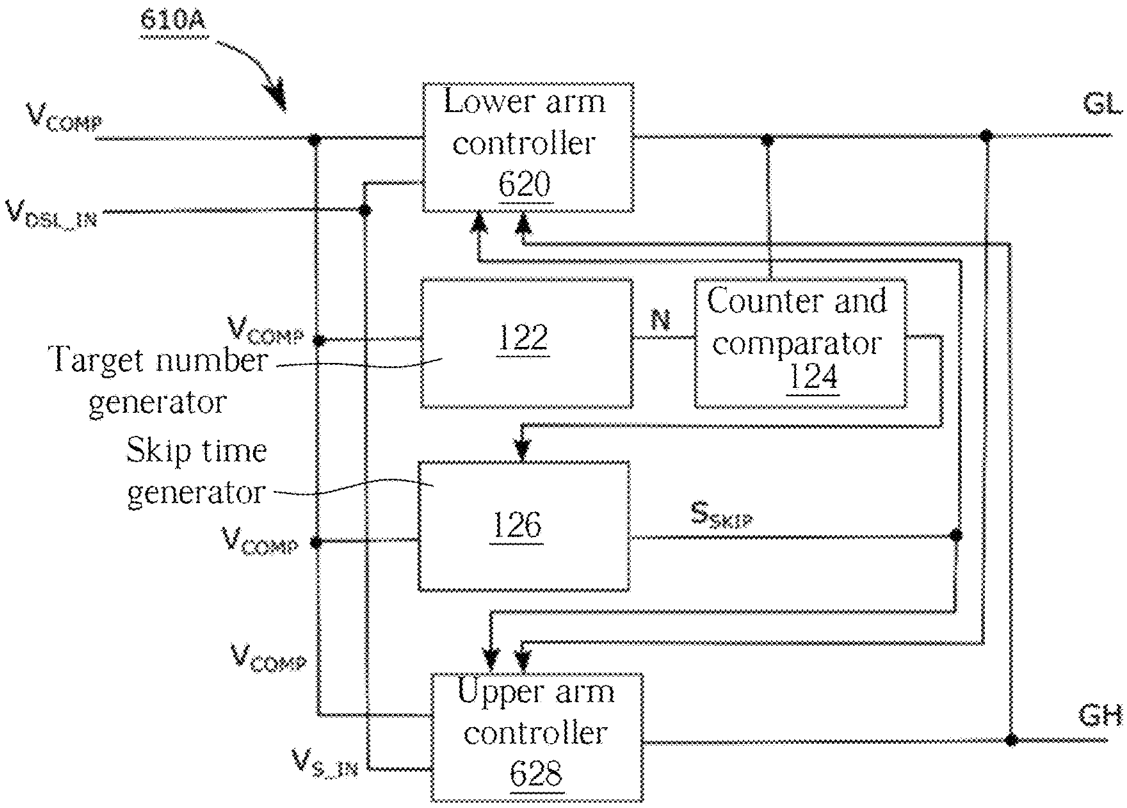
FIG. 14 illustrates another AHB controller according to an embodiment of the present disclosure.

FIG. 14 shows the AHB controller 610A as an example of the AHB controller 610 in FIG. 13. The AHB controller 610A in FIG. 14 can correspond to the AHB controller 110A in FIG. 4. The similarities between FIG. 4 and FIG. 14 can be as described above, and are not repeated here. Like the AHB controller 110A in FIG. 4, the AHB controller 610A in FIG. 14 can also provide a burst mode. Compared to the AHB controller 110A in FIG. 4, the AHB controller 610A may not have a signal converter 121, and the lower arm controller 620 and the upper arm controller 628 can directly receive the detection signal $V_{DSL\_IN}$. In practice, the switch voltage $V_{DSL}$ can be limited by the body diode in the lower arm switch SL. The switch voltage $V_{DSL}$ can be generally a positive value, and with a minimum value which is a small negative value very close to 0V, as shown in the waveform of the switch voltage $V_{DSL}$ in FIG. 8. Therefore, the signal converter 121 can be unnecessary for processing the detection signal $V_{DSL\_IN}$.

Figure 15:
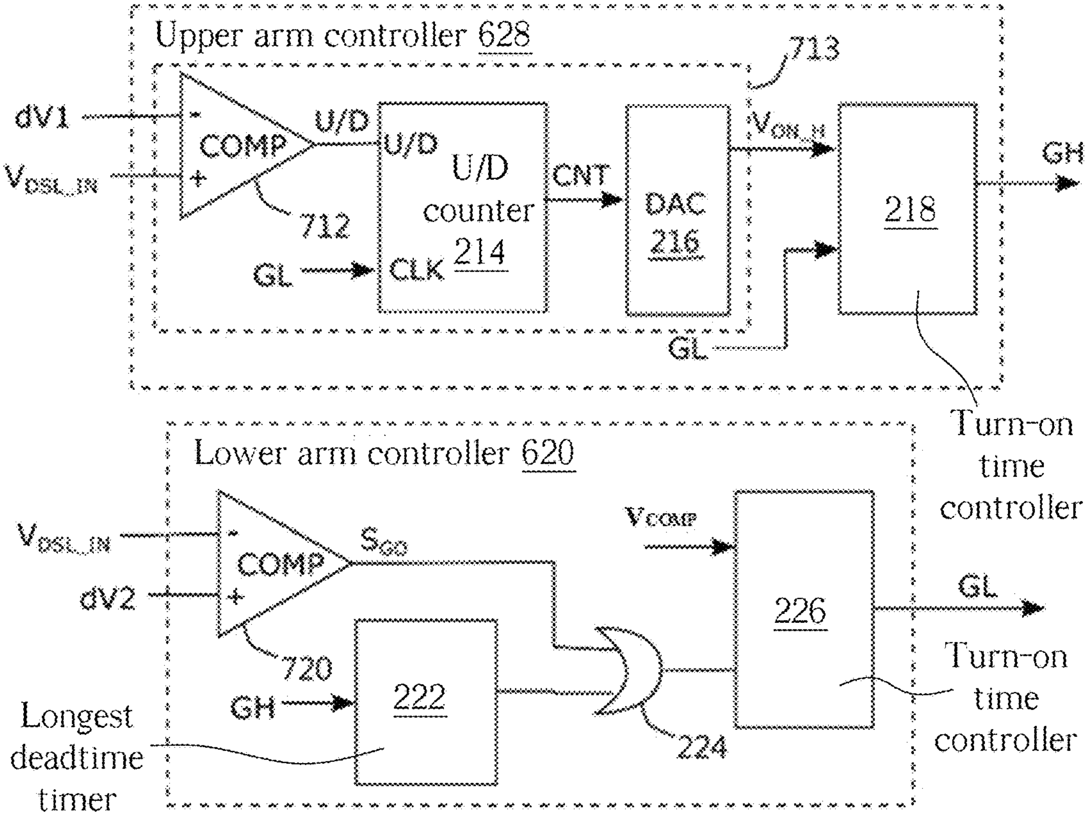
FIG. 15 illustrates the upper arm controller and lower arm controller in the AHB controller in FIG. 14.

FIG. 15 provides an example of the upper arm controller 628 and lower arm controller 620 in the AHB controller 610A. FIG. 15 can be corresponding to FIG. 7, the similarities between FIG. 15 and FIG. 7 can be described as above and not repeated here. As previously explained for FIG. 7, the AHB controller 610A in FIG. 15 can automatically and appropriately adjust the upper arm turn-on time TON GH and deadtime TDHL, allowing the lower arm switch SL to approximately perform ZVS, and also allowing the circuit to be operated roughly at CRM in each switching cycle. Compared to FIG. 7, FIG. 15 does not have the signal converter 121 and ZVS reference level recorder 210 in FIG. 7. The AHB controller 610A does not need to record the reference level of the detection signal VDSL_IN when the lower arm switch SL is turned on. Because when the lower arm switch SL is turned on, the switch voltage VDSL and detection signal VDSL_IN should both be OV. In FIG. 15, a comparator 712 can detect whether the detection signal VDSL_IN has dropped to a default value dV1 (i.e., the first default value) very close to OV, and use the edge of the control signal GL as the clock signal of counter 214 to determine whether the lower arm switch SL has performed ZVS. In FIG. 15, a comparator 720 can detect whether the detection signal VDSL_IN has dropped to a default value dV2 (i.e., the second default value) that is very close to OV. This detection is used to determine if the detection signal VDSL_IN is low enough and is nearing the reference level that can allow the lower arm switch SL to perform ZVS, and the deadtime TDHL can be controlled accordingly. As mentioned above, in practice, when the detection signal VDSL_IN drops during the deadtime TDHL, the change of the logic value of the output of the comparator 720 should occur earlier than the change of the logic value of the output of the comparator 712. For example, the default values dV1 and dV2 can be 0.1V and 0.2V, respectively.

Figure 16:
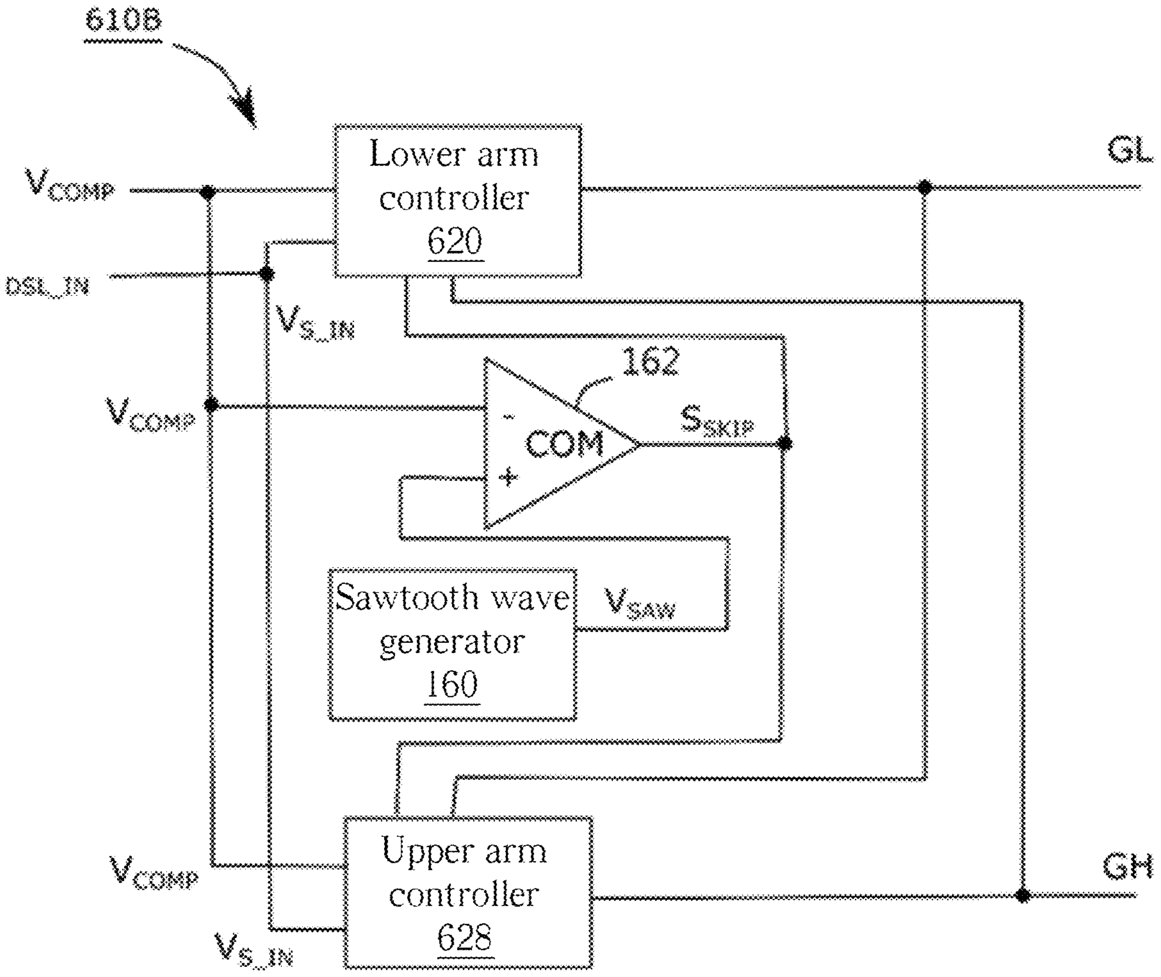
FIG. 16 illustrates another AHB controller according to an embodiment of the present disclosure.

FIG. 16 shows an AHB controller 610B as an example of the AHB controller 610 in FIG. 13. The AHB controller 610B in FIG. 16 can correspond to the AHB controller 110B in FIG. 10, and the similarities between them can be as described above and will not be repeated. Like the AHB controller 110B in FIG. 10, the AHB controller 610B in FIG. 16 can compare the sawtooth wave signal $V_{SAW}$ and the compensation signal VCOMP to provide the burst mode. The AHB controller 610B can also automatically adjust the upper arm turn-on time $T_{ON\_GH}$ and deadtime $T_{DHL}$ appropriately, allowing the lower arm switch SL to approximately perform ZVS.

In the following text, some embodiments are described.

Embodiment 1: A control method is provided for an asymmetric half-bridge power supply. The asymmetric half-bridge power supply can include a first arm switch and a second arm switch that form a half-bridge. The first arm switch and the second arm switch can be used to control a resonant circuit. The first arm switch and the second arm switch can be controlled by a controller. The resonant circuit can include a transformer and an oscillating capacitor. The control method can include:

- providing a burst mode, where in the burst mode, the controller can generate a first set of switch operation periods and a second set of switch operation periods, the first set of switch operation periods and the second set of switch operation periods each include at least one switching cycle, in each switching cycle the first arm switch and the second arm switch can be only turned on once, from the end of the first set of switch operation periods, the controller can keep the first arm switch and the second arm switch continuously off turned for a skip time, until the second set of switch operation periods begins;
- detecting whether the first arm switch has performed ZVS when it is turned on in the first switching cycle; and
- based on whether the first arm switch has performed ZVS when it is turned on in the first switching cycle, adjusting a second turn-on time of the second arm switch in the first switching cycle to assist the first arm switch in performing ZVS when the first arm switch is turned on in the second switching cycle following the first switching cycle.

In this way, the controller can control the first arm switch and the second arm switch that form a half-bridge, and provide the burst mode. In the burst mode, the controller can generate at least one or a series of switching cycles, in each switching cycle the upper arm switch and the lower arm switch can be only turned on once. After the switching cycles and before the start of other switching cycles, the controller can keep the first arm switch and the second arm switch continuously turned off for a skip time, thereby effectively reducing the energy transmitted to the secondary side when the load changes from heavy load to medium load or from medium load to light load. And, in each switching cycle of the burst mode, the controller can detect whether the first arm switch has performed ZVS, to adjust the turn-on time of the second arm switch, so that at the start of the next switching cycle, the first arm switch can perform ZVS, thereby reducing switching loss and improving conversion efficiency.

Example 2. According to the method described in Embodiment 1, the first switching cycle and the second switching cycle can be two consecutive switching cycles within the first set of switch operation periods. The controller can automatically adjust the start time of the second switching cycle based on whether the first arm switch has performed ZVS in the first switching cycle.

Embodiment 3. According to the method described in Embodiment 1 or 2, in each switching cycle under the burst mode, the controller can determines the first turn-on time of the first arm switch based on a compensation signal, and the compensation signal can be controlled by an output voltage of the asymmetric half-bridge power supply.

Embodiment 4. According to the method described in any of the above embodiments, under the burst mode, the controller can determine a target number based on the compensation signal, and counts the number of switching cycles during the first set of switch operation periods, and when the number of switching cycles is equal to the target number, the skip time can begin. The compensation signal can be controlled by the output voltage of the asymmetric half-bridge power supply, and the target number can be greater than or equal to 2.

Embodiment 5. According to the method described in any of the above embodiments, when the output voltage increases, the corresponding compensation signal can decrease, and the target number can decrease correspondingly.

Embodiment 6. According to the method described in any of the above embodiments, under the burst mode, the controller can determine the length of the skip time based on a compensation signal, the compensation signal is controlled by the output voltage of the asymmetric half-bridge power supply.

Embodiment 7. According to the method described in any of the above embodiments, when the output voltage increases, the corresponding compensation signal can decrease, and the length of the skip time can increase correspondingly.

Embodiment 8. According to the method described in any one of the above embodiments, the method can also includes:

- providing a critical mode by the controller when the compensation signal is higher than a first preset reference value, so that the second set of switch operation periods and the first set of switch operation periods are consecutive, wherein the compensation signal can be controlled by the output voltage of the asymmetric half-bridge power supply.

Embodiment 9. According to the method described in any one of the above embodiments, the method can also include:

when the compensation signal is greater than a third preset reference value and less than the first preset reference value, the controller providing a combination mode of a critical mode and a burst mode to make the skip time greater than 0.

Embodiment 10. According to the method described in any one of the above embodiments, the method can also include:

when the compensation signal is lower than a second preset reference value, preventing the first turn-on time of the first arm switch from shortening as the compensation signal decreases, wherein the second preset reference value can be greater than the third preset reference value and less than the first preset reference value.

Embodiment 11. According to the method described in any one of the above embodiments, the method can also include:

when the compensation signal is lower than a third preset reference value, the controller providing a sleep mode to continuously turn off the first arm switch and the second arm switch until the asymmetric half-bridge power supply exits the sleep mode, where the third preset reference value can be less than the first preset reference value.

Embodiment 12. According to the method described in any one of the above embodiments, in each switch operation period, there can be a pre-magnetization pulse that magnetizes the transformer. The pre-magnetization pulse can occur before the start of at least one switching cycle.

Embodiment 13. According to the method described in any one of the above embodiments, the method can also include:

generating a sawtooth wave signal; and comparing the sawtooth wave signal and the compensation signal to determine the skip time;

wherein, the compensation signal can be controlled by the output voltage of the asymmetric half-bridge power supply.

Embodiment 14. According to the method described in any one of the above embodiments, the method can also include:

providing a first control signal to turn on the first arm switch for a first turn-on time;

providing a detection signal representing real-time changes of the switch voltage across the first arm switch; and comparing the detection signal and the first default value in response to the signal edge of the first control signal to detect whether the first arm switch has performed ZVS.

Embodiment 15. According to the method described in any one of the above embodiments, the method can also include:

comparing the detection signal and a second default value to determine a deadtime following the second turn-on time.

Embodiment 16. According to the method described in any one of the above embodiments, the method can also include:

providing a first control signal to turn on the first arm switch for a first turn-on time;

providing a detection signal representing real-time changes of the winding voltage of the transformer;

sampling the detection signal as a ZVS reference level during the first turn-on time; and comparing the detection signal and the ZVS reference level in response to a signal edge of the first control signal to detect whether the first arm switch has performed ZVS.

Embodiment 17. According to the method described in any one of the above embodiments, the method can also include:

comparing the detection signal and the ZVS reference level to determine the deadtime following the second turn-on time.

Embodiment 18. According to the method described in any one of the above embodiments, the method can also include:

reducing the second turn-on time when the first arm switch is determined to have performed ZVS during the second switching cycle, so that the second turn-on time within the second switching cycle can be shorter than the second turn-on time within the first switching cycle; and increasing the second turn-on time when the first arm switch is determined not to have performed ZVS during the second switching cycle, so that the second turn-on time within the second switching cycle can be longer than the second turn-on time within the first switching cycle.

Embodiment 19. A control method for an asymmetric half-bridge power supply, the asymmetric half-bridge power supply including a first arm switch and a second arm switch that form a half-bridge, the asymmetric half-bridge power supply including a resonant circuit connected to the half-bridge, the oscillating resonant circuit including a transformer and an oscillating capacitor, the method including:

providing a duration parameter reflecting a second turn-on time of the second arm switch in a earlier switching cycle;

providing a control signal to turn on the first arm switch for a first turn-on time during the later switching cycle;

being triggered by a signal edge of the control signal to detect whether the first arm switch has performed ZVS, and adjusting the duration parameter accordingly;

determining a second turn-on time of the second arm switch in the later switching cycle based on the adjusted duration parameter; and turning on the second arm switch according to the determined second turn-on time after the first turn-on time;

wherein, as a result, by providing the duration parameter that reflects the second turn-on time of the second arm switch in the earlier switching cycle, and adjusting this duration parameter by detecting whether the first arm switch has performed ZVS in the later switching cycle, the turn-on time of the second arm switch in the later switching cycle can be more accurately controlled, and this allows the first arm switch to more easily perform ZVS at the start of the next switching cycle, thereby effectively reducing switching loss and improving conversion efficiency.

Embodiment 20. According to the method described in Embodiment 19, the transformer can provide a winding voltage, and the method can also include:

providing a detection signal representing real-time changes of the winding voltage; and comparing the detection signal and the first default value in response to the signal edge to detect whether the first arm switch has performed ZVS;

wherein, as a result, the detection signal can be a continuous analog signal reflecting the real-time changes of the winding voltage, thus eliminating the need for an additional step of "setting a sampling time point to sample the winding voltage and storing the analog value" to obtain a signal reflecting the winding voltage, and avoiding errors in the detection signal that may be introduced by setting the sampling time point too early or too late.

Embodiment 21. According to the method described in any one of the above embodiments, the method can also include:

sampling the detection signal when the first arm switch is turned on for the previous time to generating a ZVS reference level; and comparing the detection signal with the ZVS reference level in response to the signal edge to detect whether the first arm switch has performed ZVS.

Embodiment 22. According to the method described in any one of the above embodiments, comparing the detection signal with the ZVS reference level in response to the signal edge to detect whether the first arm switch has performed ZVS can include:

in response to the signal edge, determining a first difference between the ZVS reference level and the detection signal;

determining the first arm switch has performed ZVS when the first difference is less than or equal to the first default value;

determining the first arm switch has not performed ZVS when the first difference is greater than the first default value.

Embodiment 23. According to the method described in any one of the above embodiments, the method can also include:

starting to turn on the first arm switch based on the detection signal and the ZVS reference level.

Embodiment 24. According to the method described in any one of the above embodiments, the method can also include:

comparing the detection signal and a second default value to start turning on the first arm switch, wherein the second default value can be greater than the first default value.

Embodiment 25. According to the method described in any one of the above embodiments, comparing the detection signal and the second default value to start turning on the first arm switch can include:

sampling the detection signal when the first arm switch is turned on for the previous time to generate a ZVS reference level;

determining a second difference between the ZVS reference level and the detection signal;

determining to start turning on the first arm switch when the second difference is greater than or equal to the second default value.

Embodiment 26. According to the method described in any one of the above embodiments, comparing the detection signal and the first default value in response to the signal edge to detect whether the first arm switch has performed ZVS can include:

comparing the detection signal and the first default value to generate a comparison result; and incrementing or decrementing a count as the adjusted duration parameter.

Embodiment 27. According to the method described in any one of the above embodiments, the method can also include:

directly detecting a switch voltage across the first arm switch; and determining whether the first arm switch has performed ZVS based on the switch voltage.

Embodiment 28. A controller for an asymmetric half-bridge power supply is provided. The asymmetric half-bridge power supply can include a first arm switch and a second arm switch that form a half-bridge and are used to control a resonant circuit. The resonant circuit can include a transformer and an oscillating capacitor. The controller can be used to control the first arm switch and the second arm switch. The controller can include a first arm controller, used to provide a first control signal to turn on the first arm switch for a first turn-on time; and a second arm controller, used to provide a second control signal to turn on the second arm switch for a second turn-on time, including:

a ZVS detection circuit, used to provide a duration parameter reflecting the second turn-on time of the second arm switch in the earlier switching cycle, be triggered by the signal edge of the first control signal to detect whether the first arm switch performs ZVS, and adjust the duration parameter accordingly; and a turn-on time controller, used to determine the second turn-on time in the later switching cycle based on the adjusted duration parameter.

Embodiment 29. According to the method described in any one of the above embodiments, the ZVS detection circuit can include:

a comparator used to compare the detection signal and the default value to generate a comparison result; and a recorder used to be triggered by the signal edge to determine the adjusted duration parameter based on the comparison result;

wherein the detection signal can represents real-time changes of the switch voltage across the first arm switch, and as a result, the detection signal can be a continuous analog signal reflecting the real-time changes of the switch voltage, thus eliminating the need for additional steps of "setting a sampling time point to sample the switch voltage, and storing the analog value" to obtain a signal reflecting the switch voltage, thereby avoiding errors in the detection signal that may be introduced by setting the sampling time point too early or too late.

Embodiment 30. According to the method described in any one of the above embodiments, the recorder can includes:

a counter, used to use the first control signal as a clock signal, and increment or decrement a count based on the comparison result; and an analog-to-digital converter, used to generate the adjusted duration parameter based on the count generated by the counter.

Because both the comparator and the counter are digital circuits, it is allowed to determine whether the first arm switch has performed ZVS in the later switching cycle through the digital circuit. Compared with using an analog circuit to determine whether the first arm switch has performed ZVS in the later switching cycle through an analog signal, it can reduce the interference caused by fluctuations in analog signals (such as voltage signals), thereby effectively improving the anti-interference effect in the power circuit.

Embodiment 31. According to the method described in any one of the above embodiments, the transformer can include a main winding and an auxiliary winding, the main winding can be electrically connected to the oscillating capacitor, the controller can also include:

a signal converter, electrically connected to the auxiliary winding through a resistor, and used to provide a detection signal representing real-time changes of the winding voltage of the auxiliary winding; and a ZVS reference level recorder, used to sample the detection signal to generate a ZVS reference level;

wherein, the ZVS detection circuit can compare the detection signal with the ZVS reference level in response to the signal edge to determine the adjusted duration parameter.

Embodiment 32. According to the method described in any one of the above embodiments, the second arm controller can be electrically connected to the first arm switch to provide a detection signal representing the real-time changes of the switch voltage across the first arm switch, and the second arm controller can be used to compare the detection signal and the first default value to determine the adjusted duration parameter.

Embodiment 33. According to the method described in any one of the above embodiments, the first arm controller can include:

a comparator used to compare the detection signal and the second default value to generate a start signal; and a turn-on time controller used to receive the start signal to determine a deadtime immediately following the second turn-on time.

Embodiment 34. According to the method described in any one of the above embodiments, the first arm controller can also include a longest deadtime timer, used to provide a longest deadtime, where the deadtime may not be greater than the longest deadtime.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for an asymmetric half-bridge power supply, the asymmetric half-bridge power supply comprising a first arm switch and a second arm switch forming a half-bridge, the asymmetric half-bridge power supply further comprising a resonant circuit coupled to the half-bridge, the resonant circuit comprising a transformer and an oscillating capacitor, the control method comprising:

providing a duration parameter stored from an earlier switching cycle, the duration parameter indicating a length of a previous second turn-on time of the second arm switch in the earlier switching cycle;

providing a control signal to turn on the first arm switch for a first turn-on time;

when a signal edge of the control signal turns on the first arm switch, detecting whether the first arm switch has performed ZVS (zero voltage switching);

adjusting the duration parameter according to whether the first arm switch has performed ZVS;

determining an updated second turn-on time for a next switching cycle based on the adjusted duration parameter; and after the first turn-on time has elapsed, turning on the second arm switch for the updated second turn-on time in the next switching cycle, the next switching cycle being immediately following the earlier switching cycle.

2. The control method of claim 1, wherein:

the transformer provides a winding voltage;

the control method further comprises providing a detection signal to represent real-time changes of the winding voltage; and triggered by the signal edge of the control signal, detecting whether the first arm switch has performed ZVS by comparing the detection signal and a first default value.

3. The control method of claim 2, further comprising:

when the first arm switch was turned on last time, sampling the detection signal to generate a ZVS reference level; and triggered by the signal edge of the control signal, detecting whether the first arm switch has performed ZVS by comparing the detection signal and the ZVS reference level.

4. The control method of claim 3, wherein detecting whether the first arm switch has performed ZVS by comparing the detection signal and the ZVS reference level in response to the signal edge of the control signal, comprises:

triggered by the signal edge of the control signal, determining a first difference of the ZVS reference level and the detection signal;

if the first difference is smaller than or equal to the first default value, determining the first arm switch has performed ZVS; and if the first difference is greater than the first default value, determining the first arm switch has not performed ZVS.

5. The control method of claim 3, further comprising:

triggering to turn on the first arm switch according to the detection signal and the ZVS reference level.

6. The control method of claim 2, further comprising:

comparing the detection signal and a second default value to trigger to turn on the first arm switch;

wherein the second default value is greater than the first default value.

7. The control method of claim 6, wherein comparing the detection signal and the second default value to start to turn on the first arm switch, comprises:

when the first arm switch was turned on last time, sampling the detection signal to generate a ZVS reference level;

determining a second difference of the ZVS reference level and the detection signal; and if the second difference is greater than or equal to the second default value, determining to trigger to turn on the first arm switch.

8. The control method of claim 2, wherein triggered by the signal edge of the control signal, detecting whether the first arm switch has performed ZVS by comparing the detection signal and the first default value, comprises:

comparing the detection signal and the first default value in response to the signal edge of the control signal to generate a comparison result; and incrementing or decrementing a count according to the comparison result, wherein the count after being adjusted is used as the adjusted duration parameter.

9. The control method of claim 1, further comprising:

directly detecting a switch voltage across the first arm switch; and determining whether the first arm switch has performed ZVS according to the switch voltage.

10. A controller for an asymmetric half-bridge power supply, the asymmetric half-bridge power supply comprising a first arm switch and a second arm switch forming a half-bridge for controlling a resonant circuit, the resonant circuit comprising a transformer and an oscillating capacitor, the controller being used to control the first arm switch and the second arm switch, the controller comprising:

a first arm controller configured to provide a first control signal to turn on the first arm switch for a first turn-on time; and a second arm controller configured to provide a second control signal to turn on the second arm switch for a second turn-on time, and comprising:

a ZVS (zero voltage switching) detection circuit configured to provide a duration parameter stored from an earlier switching cycle, the duration parameter indicating a length of a previous second turn-on time of the second arm switch in the earlier switching cycle, detect whether the first arm switch has performed ZVS when a signal edge of the first control signal turns on the first arm switch, and adjust the duration parameter accordingly; and a turn-on time controller configured to determine an updated second turn-on time for a next switching cycle based on the adjusted duration parameter and to turn on the second arm switch for the updated second turn-on time in the next switching cycle, the next switching cycle being immediately following the earlier switching cycle.

11. The controller of claim 10, wherein the ZVS detection circuit comprises:

a comparator configured to compare a detection signal and a default value to generate a comparison result; and a recorder configured to determine the adjusted duration parameter according to the comparison result in response to the signal edge of the first control signal;

wherein the detection signal represents real-time changes of a switch voltage across the first arm switch.

12. The controller of claim 11, wherein the recorder comprises:

a counter configured to use the first control signal as a clock signal to increment or decrement a count according to the comparison result; and a digital-to-analog converter to generate the adjusted duration parameter according to the count.

13. The controller of claim 10, wherein the transformer comprises a primary winding and an auxiliary winding, the primary winding is electrically connected to the oscillating capacitor, and the controller further comprises:

a signal converter electrically connected to the auxiliary winding through a resistor and configured to provide a detection signal representing real-time changes of a winding voltage of the auxiliary winding; and a ZVS reference level recorder configured to sample the detection signal to generate a ZVS reference level;

wherein the ZVS detection circuit is configured to compare the detection signal and the ZVS reference level in response to the signal edge of the first control signal to determine the adjusted duration parameter.

14. The controller of claim 10, wherein the second arm controller is electrically connected to the first arm switch to provide a detection signal, the detection signal represents real-time changes of a switch voltage of the first arm switch, and the second arm controller is configured to compare the detection signal and a first default value to determine the adjusted duration parameter.

15. The controller of claim 14, wherein the first arm controller comprises:

a comparator configured to compare the detection signal and a second default value to generate a start signal; and a turn-on time controller configured to receive the start signal to determine a deadtime immediately following the second turn-on time.

16. The controller of claim 15, wherein the first arm controller further comprises a longest deadtime timer configured to provide a longest deadtime, and the deadtime is not greater than the longest deadtime.

* * * * *